(12) United States Patent
Zelic

(10) Patent No.: US 6,352,219 B1
(45) Date of Patent: Mar. 5, 2002

(54) FLYING VEHICLE WITH LIFT GENERATORS

(76) Inventor: Safedin Zelic, Evlijo Celebija BB. 2, 71000 Sarajevo (BA)

( * ) Notice: Subject to any disclaimer, the term of this patent is extended or adjusted under 35 U.S.C. 154(b) by 0 days.

(21) Appl. No.: 09/485,340
(22) PCT Filed: Apr. 16, 1998
(86) PCT No.: PCT/BA98/00001
§ 371 Date: Apr. 6, 2000
§ 102(e) Date: Apr. 6, 2000
(87) PCT Pub. No.: WO99/07601
PCT Pub. Date: Feb. 18, 1999

(30) Foreign Application Priority Data

Aug. 8, 1997 (BA) .............................................. 97244A

(51) Int. Cl.[7] .............................................. B64C 29/00
(52) U.S. Cl. ..................................................... 244/12.1
(58) Field of Search .............................. 244/12.1, 12.2, 244/12.3, 12.4, 12.5, 23 R, 23 C, 73 R, 73 B, 73 C, 20, 70, 19, 48; 416/179

(56) References Cited

U.S. PATENT DOCUMENTS

| | | | | | |
|---|---|---|---|---|---|
| 1,360,182 A | * | 11/1920 | Cortes | .......................... | 416/179 |
| 1,487,228 A | * | 3/1924 | Garcia | .......................... | 244/48 |
| 1,820,919 A | * | 9/1931 | Massey | .......................... | 244/19 |
| 2,037,377 A | * | 4/1936 | Gardner | .......................... | 244/20 |
| 2,092,052 A | * | 8/1937 | Kirsten | .......................... | 244/20 |
| 2,736,514 A | * | 2/1956 | Ross | .......................... | 244/23 C |
| 2,777,649 A | * | 1/1957 | Williams | .................. | 244/23 C |
| 3,801,047 A | * | 4/1974 | Dell'aquila | .................. | 244/19 |
| 3,938,759 A | * | 2/1976 | Bastide | .......................... | 244/20 |
| 5,100,080 A | * | 3/1992 | Servanty | ...................... | 244/70 |
| 6,007,021 A | * | 12/1999 | Tsepenyuk | ..................... | 244/9 |

FOREIGN PATENT DOCUMENTS

| | | | | | |
|---|---|---|---|---|---|
| CA | 750805 | * | 1/1967 | ................ | 244/12.2 |
| GB | 747172 | * | 3/1956 | ................ | 244/20 |

* cited by examiner

Primary Examiner—Galen L. Barefoot
(74) Attorney, Agent, or Firm—Rothwell, Figg, Ernst & Manbeck

(57) ABSTRACT

An aircraft is provided including a fuselage with a drive shaft in the fuselage, in which the drive shaft drives an aerodynamic generator consisting of an aerodynamic rotor which is attached to the shaft and an aerodynamic stator which is attached to the fuselage over the rotor. A control device which is responsive to control commands is attached to the fuselage and has an actuator for controlling the aerodynamic generator. The aerodynamic generator produces an aerodynamic force in response to the commands whose intensity, direction and sense of direction can be controlled through the control device, in which vertical lifting and landing are achieved by orienting the direction and sense of direction of the aerodynamic force vertically with respect to the horizon plane.

2 Claims, 23 Drawing Sheets

FLYING VEHICLE WITH LIFT GENERATORS

BACKGROUND OF THE INVENTION

1. Field of the Invention

This invention is related to the field of aerotechnique, aeromechanics and aerodynamics in general.

2. Description of the Related Art

The invention solves the problem of design of dynamic aircraft which should take off and land vertically, have possibility to soar in a big span of altitudes; intensity of aerodynamic force can be changed independently on work of engine; direction of aerodynamic force can be changed and tied to fuselage of the aircraft or set free from fuselage position.

Several kinds of aircraft that are heavier than air have been invented so far, such as: glider, hang glider, gyro din, convertoplan, colopter, airplane, and helicopter. However, among all these flying bodies only airplane and helicopter found use. But even these two aircraft have some major defects which make impossible their mass use as individual, family, private and cargo air means of transportation. Airplane's basic defect is dependence on its takeoff power upon translational speed of its motion. It is impossible for airplane to go upwards and downwards vertically or to soar.

For take off and landing airplane needs special infrastructural installations on land which are very expensive and take large area which can be find only in the outskirts of cities; so individual and family use of this aircraft, as mass means of transportation is out of question.

Great minimum speed of the airplane while flying takes large wings' surface during takeoff and landing; which, during greater speeds, becomes extra gravitational load and extra unnecessary aerodynamic resistance. This large wings' surface requires even extra strong point in fuselage of the plane which becomes more massive and heavier. All that gravitational load and increased streamlined resistance require big thrust; which requires big quantity and consumption of fuel, which causes larger wings' surface and so negative characteristics appear differently. In this case thrust intensity does not depend directly on translational motion of the aircraft like airplane but the way that helicopter produces aerodynamic force is much more ineffective than the way how wing of the airplane does it. Therefore, surface and angle of attack of a rotor blade of a helicopter must be increased which brings about increasing of aerodynamic resistance which requires increase of-engine power and increase of fuel consumption. This causes increase of gravitational load which can be neutralized only by increasing of rotor blades' surface. However, this increase on one hand is limited by blade mass and it causes strong centrifugal load and bigger aerodynamic resistance; and on the other band, it is limited by peak of rim speed which should not be faster than speed of sound. If thrust coefficient of three blades is also added to this, it comes to peak point of possible blade surface increase on rotor of helicopter and to a total thrust power. This all reflects negatively on possible peak gravitational load and maximum translational speed which is much lesser than translational speed of the airplane.

Design of helicopter is very complex beginning with necessity for powerful engines which are mainly gas turbines which take very complex power transfer and low-range geared system. Very complex head of rotor undergoes great centrifugal, aerodynamic, and inerted loads and blades' production is great challenge in production system.

For all this helicopter is expensive, uneconomical, and complicated aircraft so it could not become mass means of transportation.

BRIEF SUMMARY OF THE INVENTION

Aeromobil unites all positive characteristics of airplane and helicopter along with some genuine characteristics which neither has airplane nor helicopter nor any other known aircraft. Aeromobil generates necessary thrust power independently from its translational speed, so that its blade-surface of rotor is used totally in each phase while flying without any extra unneeded aerodynamic, centrifugal, and gravitational loads. Thrust coefficient of its rotor blades is five times bigger than thrust coefficient of airplane wings, and even many times bigger than the thrust coefficient on rotor blades of a helicopter. This makes possible reduce of blades' surface on Aeromobil's rotor which results also in reducing of a total weight of the aircraft, which also has positive effects on necessary thrust power and fuel consumption.

Rotor blades in aerodynamic generators do not only have big thrust coefficient but also low aerodynamic resistance-coefficient for these blades during work do not produce inductive aerodynamic resistance and practically they always act as a wing of an endless wave that results in very useful consequences: necessary engine power and fuel consumption. Aeromobil can develop translational speeds like a plane and this translational speed does not effect negatively work of its aerodynamic generators; moreover, speed is used as extra airstream in aerodynamic generators for produce of aerodynamic force. Streamlined shape of the fuselage provides produce of lift force by itself during big translational speeds and so all aerodynamic power of generator is directed towards vector of lift force.

The aircraft has got great translational speed; its vertical axis can take up any direction in the space while aircraft soars; from every soaring position it can start translational motion in any direction; translational speed of the aircraft does not influence negatively work of its active aerodynamic surfaces; it has favorable ratio of total weight of the aircraft and useful load which is able to carry; control system that makes possible using of all aerodynamic, maneuvering and flying possibilities of the aircraft; control efficiency that does not depend on translational speed of the aircraft; simple, dependable, compact design of the aircraft; its production takes no complex and costly technologies; it is economical and generating of aerodynamic force demands no big fuel consumption.

All control moments of this aircraft are completely independent of translational speed which makes impossible for aircraft to have equal control efficiency no matter which translational speed or direction is in question.

Aeromobil is simple, dependable, effective and economical aircraft. Its production does not requires any special or expensive technologies.

DETAILED DESCRIPTION OF THE INVENTION

Aeromobil is dynamic flying machine. It produces necessary force for lift, thrust and control moments, in aerodynamic generators. Aerodynamic generator is compound of two main parts, Aerodynamic Stator and Aerodynamic Rotor.

Stator has function to transform translational air speed (which occurs during translational motion of the aircraft) into secondary rotating air speed, which has same direction as well as primary rotating air speed of rotor. In that way, total rotating air speed in generator during translational motion is increased to value of secondary rotating speed which is proportional to translational motion of the aircraft.

Figure 2:
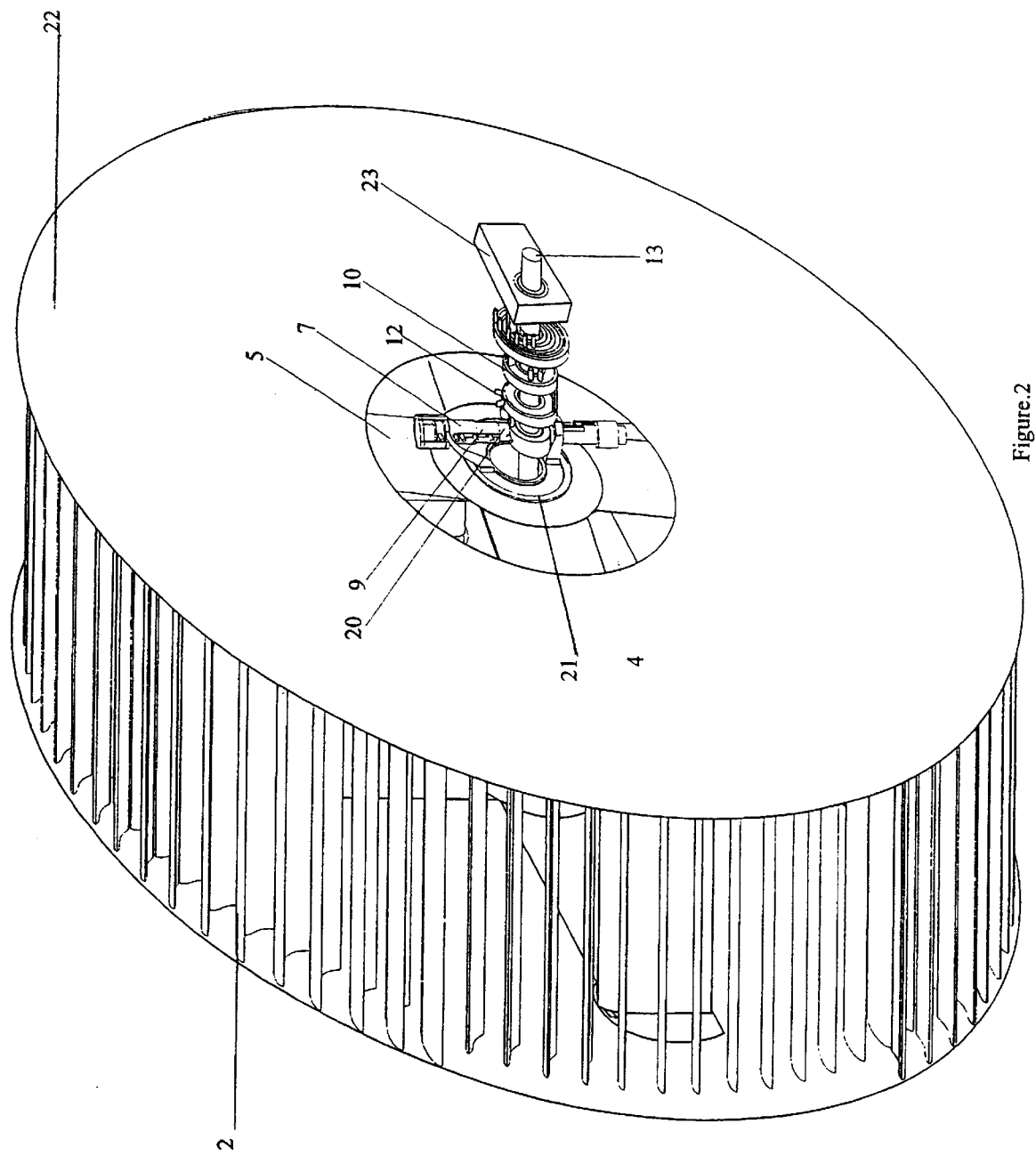
FIG. 2. Aerodynamic generator with Control head and drive shaft.

Stator is round aerodynamic grid consisted of aeroprofile put parallelly in regard to drive shaft of rotor (FIG. 2). Aeroprofiles of stator (10) are placed so that translational and parallel air stream (which occurs at entrance in stator's aeroprofiles) is transformed into rotating air stream at the exit of stator's aeroprofiles. Output air speed has direction of tangent line on circle orbit of blades of rotor. Front resistance is lower and total aerodynamic force is positive or zero by putting blades of stator in this way. To achieve this, it is necessary to put two line of stator blades in the position of. stator where lift is negative. It means upper-blades and down-blades of stator are reciprocally opposite. Only the part of stator which produces lift force has a line of blades which are twice bigger proportionally than blades from double line. Besides, it is necessary that rotor rotates in direction of watch hand. Stator is immobile and attached to fuselage of the aircraft.

It is closed from lateral sides so that air can get inside stator only through fissure among stator blades.

Figure 4:
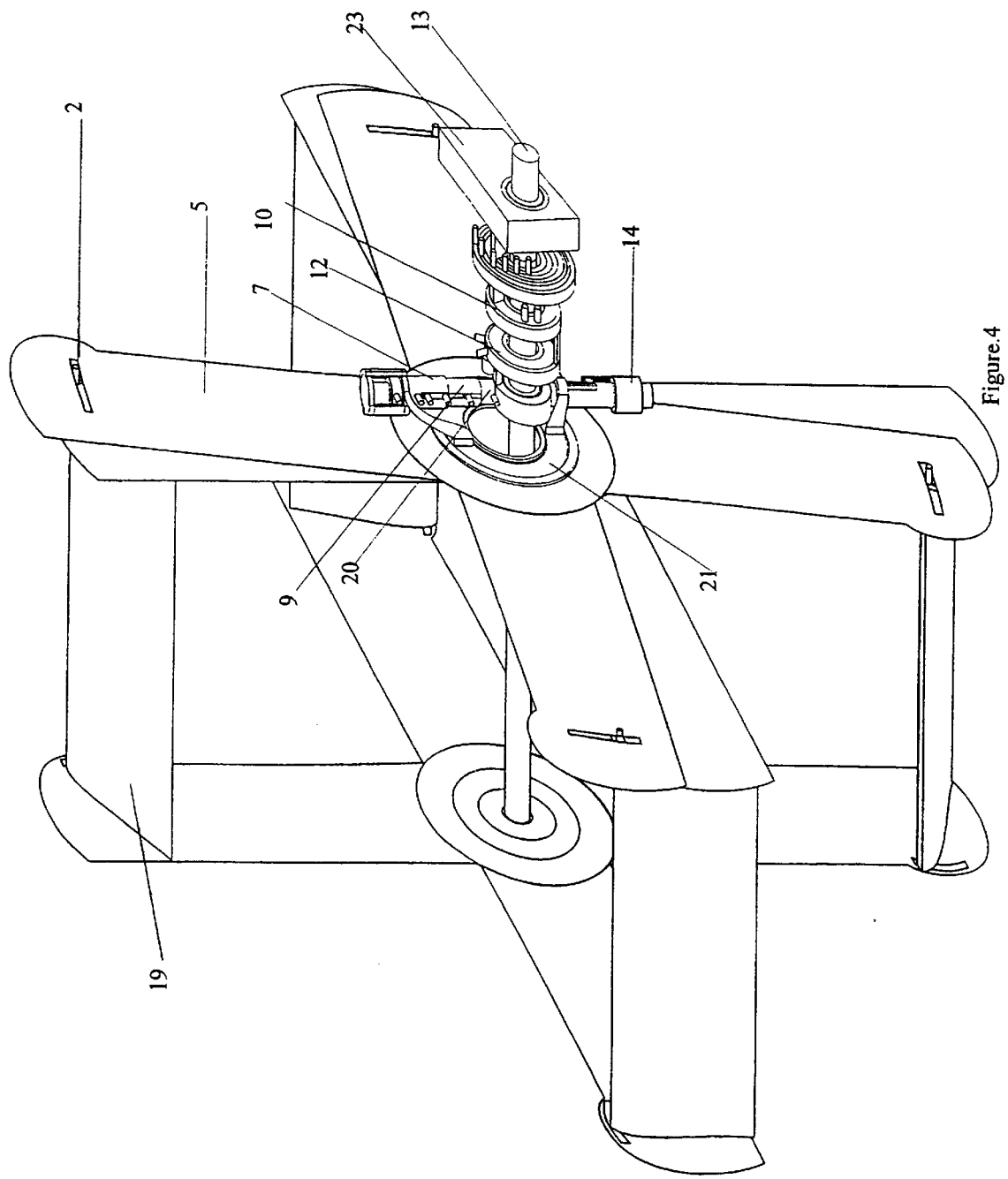
FIG. 4. Rotor of aerodynamic generator together with hydraulic Control head and drive shaft.

Rotor of aerodynamic generator is the most important part of the aeromobil (FIG. 4). Rotor generates necessary aerodynamic force for lift thrust and control moments. It is consisted of Drive shaft (13), Blades' carriers 4), Blades' guide (5), and Control head.

Drive shaft (13) is placed horizontally and goes through center of rotor. This shaft has function to move rotor and in the same time accepts all aerodynamic and gravitational force of the aircraft.

Blades' carriers (4) have function to hold rotor blades (19) and they are firmly attached to Drive shaft and they rotate together with it. Guide (5) has function to guide guiding shaft of rotor blades and give them necessary eccentricity. It is not fixed with Drive shaft (13). It is connection between Control head and blades of rotor (19).

Rotor blades (FIGS. 5–6) are streamlined bodies of symmetrical aeroprofiles with constant vertical section. They have function to generate aerodynamic force necessary for lift, thrust and control.

Two shafts placed parallelly with its front and back edge are situated on them. These are Main shaft (8) and Guiding shaft (2). Main shaft (8) goes through rotor blade center of gravity and through center of aerodynamic lift which should go along with blade center of gravity (19). This shaft takes on all centrifugal and aerodynamic force from blade and transmits them to carriers of blade (4).

Blades generate aerodynamic force in the way that Main shaft (18) of rotor blade (19) rotates around Drive shaft and Guided shaft (2) of blade (19) rotates around shaft of Eccentric bearing (21).

Figure 7:
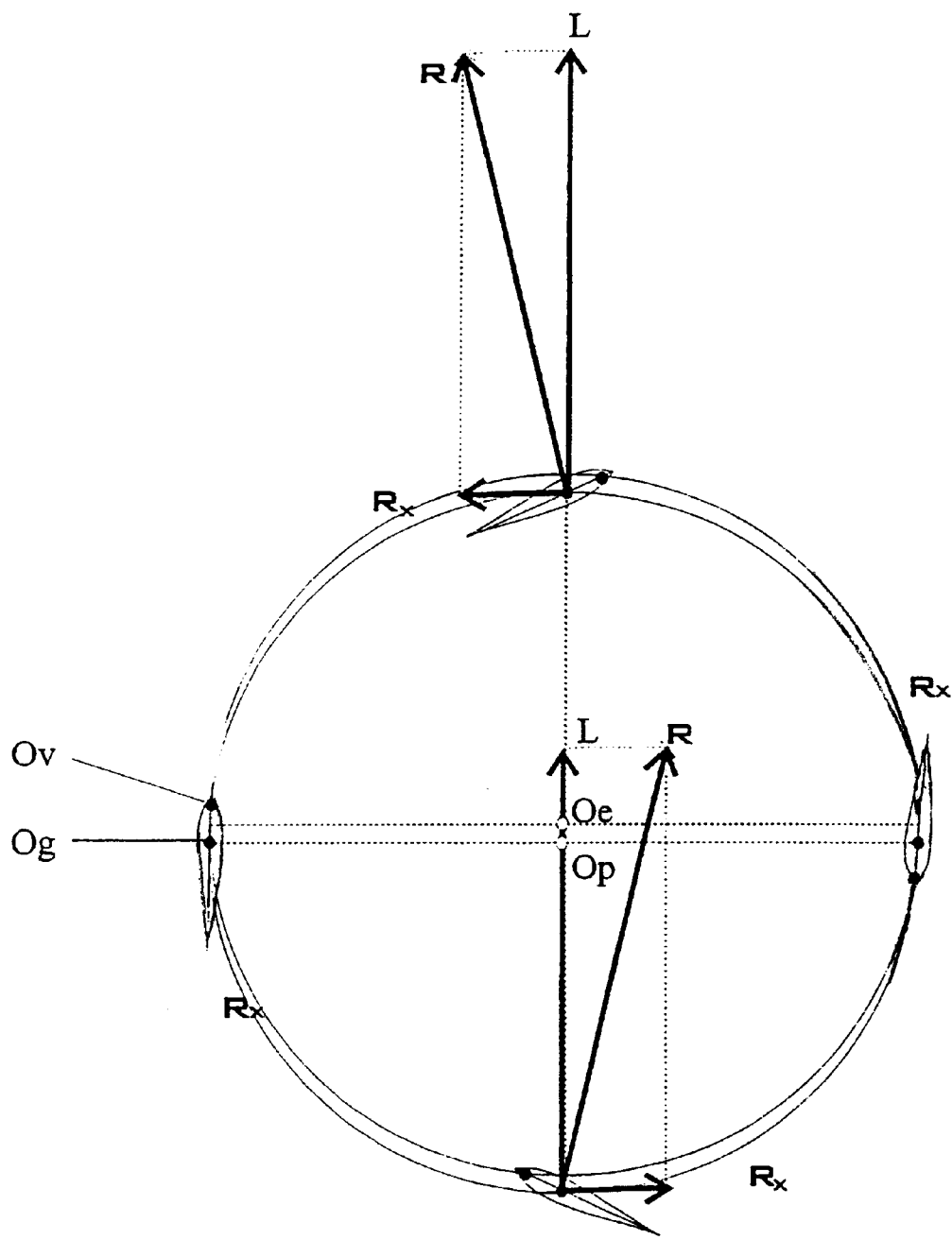
FIG. 7. Presents periodic change of angle of attack of rotor blades in period of one rotation.
Figure 8:
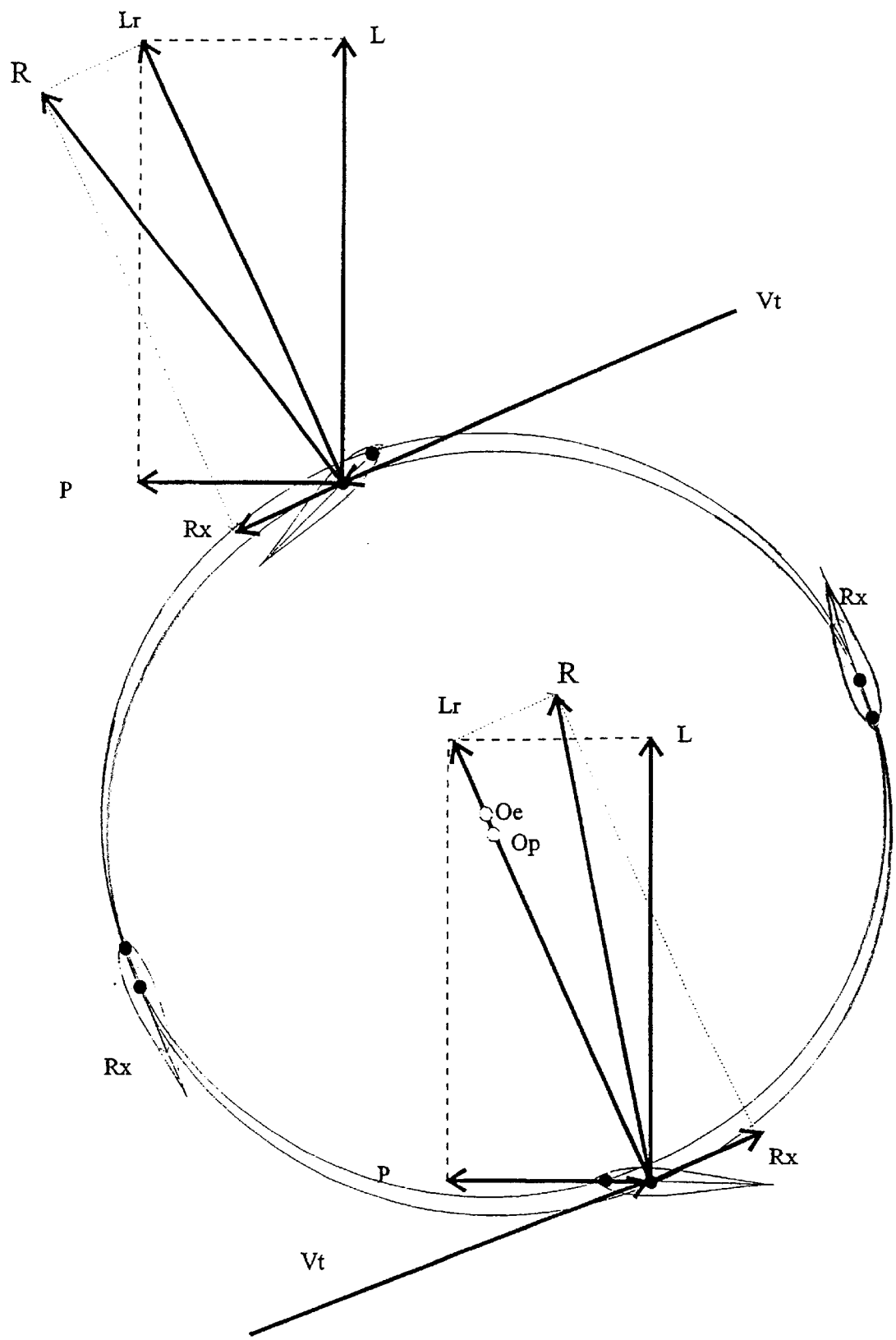
FIG. 8. Presents periodic change of angle of attack of rotor blades in the state of produce of Lift and Propulsion's vector (P).
Figure 9:
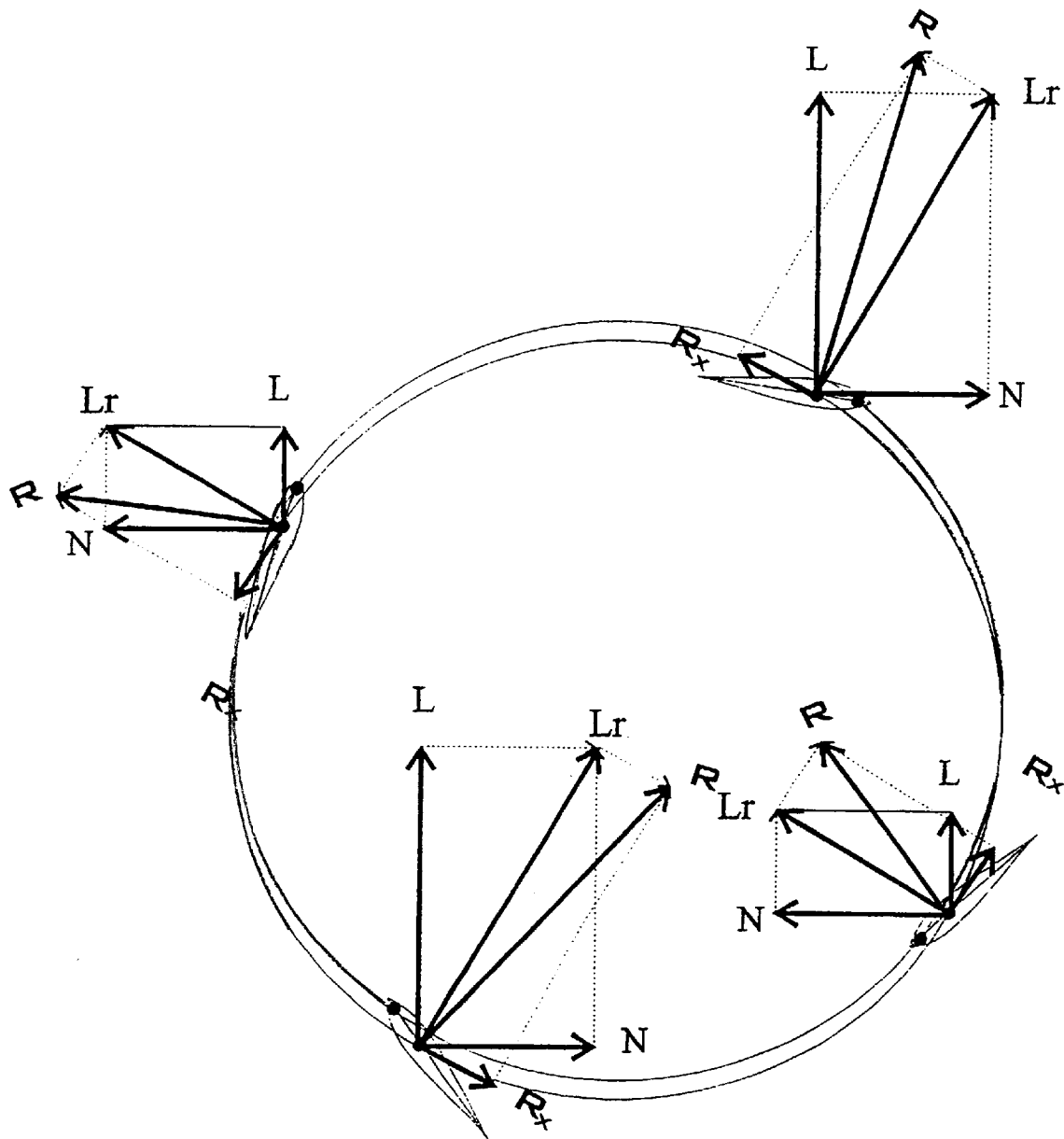
FIG. 9. Presents constant value of horizontal component of Lift Vector.

In that way, blades are placed in necessary angle of attack which is the biggest on that part of orbit were eccentricity of Guided shaft (2) is the biggest (FIG. 7). Just on the same place intensity of aerodynamic force is the biggest as well. (This is intensity of its vertical component which presents Lift vector.) Direction of this vector coincides with direction of vector of eccentricity of Eccentric bearing (21) with initial point in the center of Drive shaft (13). During turning of this eccentricity or its increase, lift direction and its turning are also increased (FIG. 8). All horizontal components are cancelled mutually in the way that horizontal component of aerodynamic force of blade (which is located in the first quadrant of circle orbit) is cancelled by horizontal component of neighbouring blade in second quadrant (FIG. 9). In any point of blade's orbit these components have same intensity and opposite direction. In the same way horizontal component of aerodynamic force (which is located in third and fourth quadrant of circle of orbit of rotor blade) are cancelled.

Every rotor has four blades put symmetrically in regard to Drive shaft (13), so that only one blade of rotor can be found in every quadrant each moment. Forming of angle of attack is done according to sinus law which provides constant value of total sum of Lift vector of all four blades, no mater in which point of circle orbit blades are found. Guided shaft (2) has function to put blades in necessary angle of attack. Also, this shaft transmits one lesser part of aerodynamic force to Drive shaft (13) across Guide and Eccentric bearing which is necessary for maintaining of lift direction independent from position of the aircraft body which happens in Extreme order of control.

Control head of rotor (FIG. 10) is consisted of one Eccentric bearing (21), two Carriers of Eccentric bearing (25), three hydraulic Cylinders for change of angle of attack (CCAA) of rotor blades, two hydraulic Cylinders for change of lift direction (CCLD), Electromagnetic connection (32), rotating hydraulic connection (33) and rotor carriers (23).

Eccentric bearing (21) has function to carry guide (5) and gives it necessary eccentricity in relation to Drive shaft (13) of rotor. It is connected with pistons of hydraulic CCAA which can move up and down if necessary. During this, it increases and reduces eccentricity of Eccentric bearing (21), that is, increase and reduce of angle of attack of rotor blades (19), which, in the end, causes increasing, reduce of total aerodynamic force. This eccentricity can be as positive as well as negative.

Hydraulic CCAA (FIG. 11) are: Cylinder of group change of angle of attack (CGCAA) (20), Cylinder CMx (7) and Cylinder CMy (9). Mutual position of these cylinders is conditioned by function they do. Because of this, CGCAA is put as a base for other two cylinders. Piston of this cylinder (6) is connected to CMy (9) cylinder body. Piston of this cylinder (36) is connected with Eccentric bearing (21) that is, with Guide (5).

During work of piston in CGCAA(38), other two cylinders are moved together with its pistons. It is further transmitted to Eccentric bearing (21) i.e. to change angel of attack of rotor blades (19) during work of piston in cylinder CMx (7), translational motion of piston and cylinders CMy (9) happens, and all this move Eccentric bearing (21) in direction of cylinder's piston CMx's motion. In this case, cylinder as well as piston CGCAA (20) are not moving. During activation of cylinder CMy (9) only its piston moves tighter with Eccentric bearing. During that time, piston CGCAA and CMx (97) are still.

Function of hydraulic CGCAA (20) is to bring about equal and simultaneous change of angle of attack of rotor blades (19) on all four (or even more) aerodynamic generators (40). Cylinder CMx (7) has function to produce equal but regarding to direction, opposite change of angle of attack of lateral generators.

Cylinders CMy (9) have the same function, only their effect is related to two front and two back generators.

Hydraulic cylinders for change of lift direction (CCLD) are: Cylinder for group change of direction of lift (CGCDL) (10) and cylinder CMz (12). These cylinders differ from CCAA by the thing that their pistons circle during work i.e. bring about rotation of object for which they are tied. These cylinders are mutually placed in the way that activation of piston in CGCDL brings about moving of cylinder and piston CMz (12). During activation of Piston CMz (16), motion of CGCDL does not happen because these two are not connected physically. CGCDL (10) has function to turn Eccentric bearing (21) around Drive shaft (13) and in this way change direction of Eccentricity, which means that lift direction has changed for the same angle value. These cylinders move direction of lift simultaneously and in the same direction on all four generators. Cylinders CMz (12) do the same only their effect is pointed to lateral generators so that angle of Thrust vector is equal on both sides of the aircraft but has opposite direction.

Electromagnetic connection (32) is located between Piston of CMz (12) and Carrier of CGCDL. This connection has function to separate these two bodies in order to stop physical contact between Control head of rotor and aircraft fuselage. This is necessary when the aircraft should be in order of work and when lift direction of all generators becomes independent from position of the aircraft.

Rotating hydraulic connection (33) is consisted of mobile disk on which are located receptacles for hydraulic cylinders and connection body which is tightly tied to Carrier of generator (31) and from which go receptacles to main hydraulic distributors. This connection provides charge to cylinder with oil under pressure in those conditions when aircraft flies and it is necessary that lift direction is independent from position of aircraft.

Carrier of aerodynamic generator (23) has function to transmit all gravitational and aerodynamic loads from generator to fuselage of the aircraft. This is Bearing (13) through which goes drive shaft (13) of rotor on it.

Figure 12:
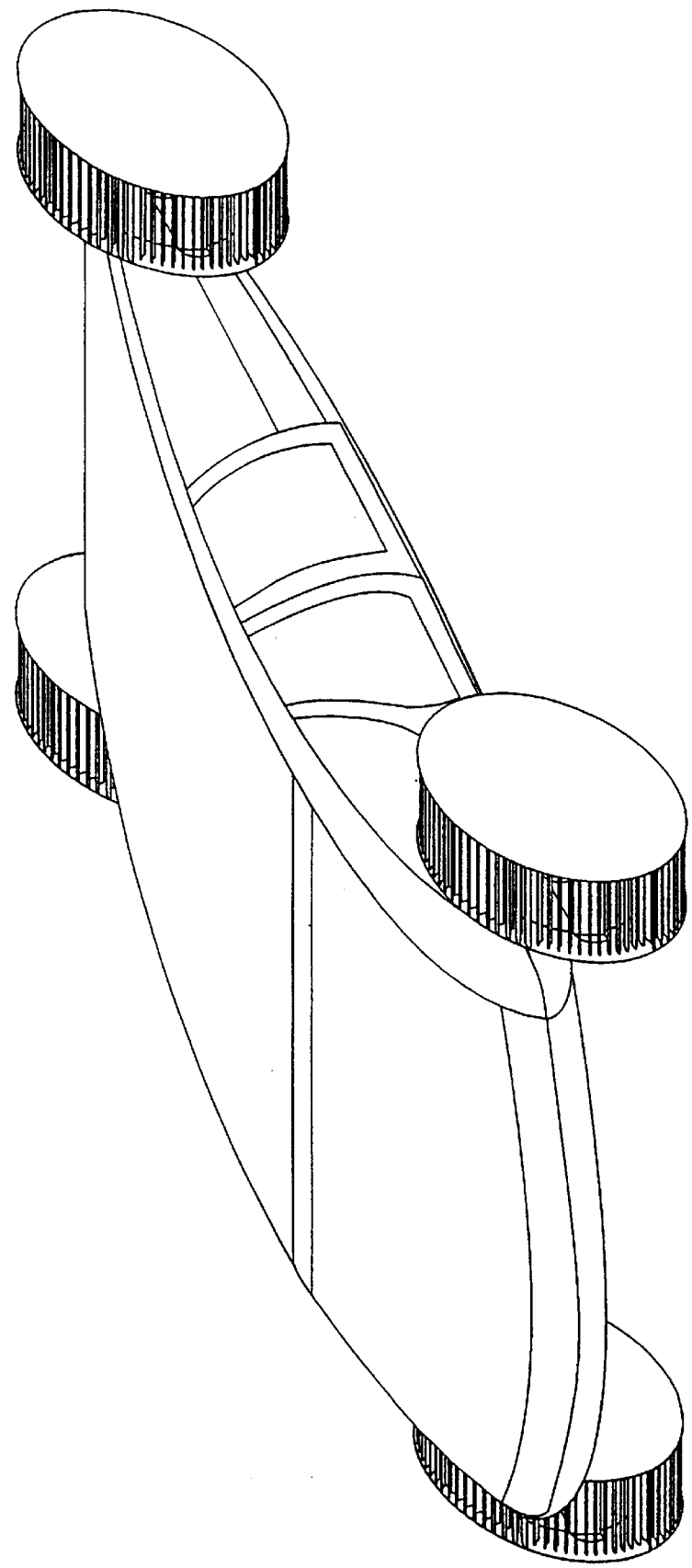
FIG. 12. Aeromobil, family version

Basic concept of Aeromobil has four aerodynamic generators placed on angles of imagined rectangular base of aircraft (FIG. 12). Depending on that whether this imagined base goes through gravitational center, above, or below it, the aircraft takes position of indifferent, labile and stable balance, respectively. On FIG. 10., this base goes through gravitational center and it is in position of indifferent balance.

Aeromobil's fuselage has two basic shapes. One is family or cargo, (FIG. 12.), and the other is sports version. Both fuselages are designed so that their resistance force is lesser as much as possible. This fuselage should produce aerodynamic lift which provides increase of Thrust vector on aerodynamic generators during certain translational speed.

That phenomenon is particularly expressed in family model of the Aeromobil which is in fact aerodynamic profile similar to wing of airplane. Controls and flying instruments, motor group, fuel tanks and transmission are situated in it. This fuselage (aerodynamic profile) could be. brought under favorable angle of attack during translational speed of the aircraft with the help of activation of hydraulic cylinders CMy (9) i.e. bringing about My moment.

Thrust group (42) is situated in back part of the fuselage (FIG. 14) and it is consisted of one or two engines or gas turbines which start Main drive shaft (46) which again, by transmission and conical gears, starts all four drive shafts of rotor (13). Transmission is classic, it is simple, for -it dermands little ratio of transmission. Pilot and space for passengers are situated in the front part of the aircraft.

Controlling of the Aircraf

All necessary control moments are generated on rotors of Aerodynamic generators of Aeromobil (FIGS. 15–19). Each Aeromobil has four aerodynamic generators placed on angles of imagined rectangular base of the aircraft. By increasing and reducing of total value of Lift vector on each rotor or changing of its direction and course, it is possible to produce necessary moments around all three space axles initiating with center of gravity of the aircraft. This opposite-proportional change of intensity and direction of Lift vector on front two generators in relation to back two brings about rotation around transverse axle y. This same change of intensity and direction of Lift vector on right two generators in relation to left generators brings about rotating moment round longitudinal axle x of the aircraft.

Opposite proportional change of direction of Lift vector on right in relation to left generators brings about rotating around vertical axle z of the aircraft Change of intensity of Lift vector of each Aerodynamic generator is done by Cylinders of change of angle of attack (CCAA) which increase or reduce eccentricity of Eccentric bearing. Eccentricity is transmitted to Guiding shaft of blades which changes angle of attack of blades that brings about change of Lift vector.

Change of direction of Lift vector is done by Cylinders for change of direction of lift (CCDL) which turns eccentricity of Eccentric bearing in relation to Drive shaft and brings about turning of direction of Lift vector in the same direction. In that way Lift vector gets translational component which is caused on all four generators in the same time and gives thrust force to Aeromobil. This thrust force (Thrust vector) is proportional to angle of turn of Eccentric bearing and intensity of Lift vector. AU these control moments are attained by specific hydraulic system of control.

This hydraulic system is consisted of cylinders which are on each generator in number of five. These are: CGCAA (20), Cylinder CMx (6), Cylinder CMy (9), Cylinder CMz (12) and CGCLD (10). These cylinders are connected to special hydraulic distributors by which work of cylinders is controlled.

Figure 20:
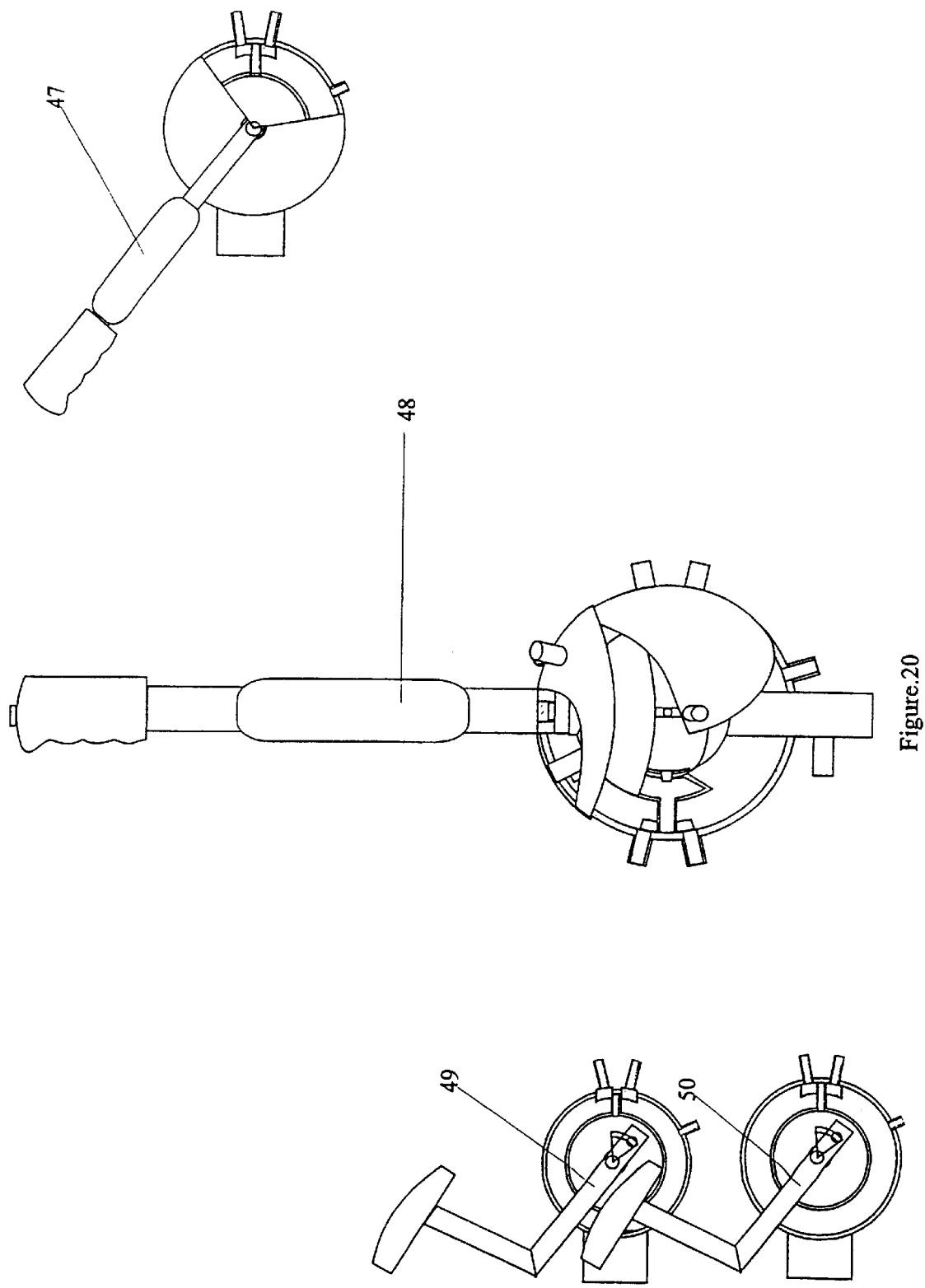
FIG. 20. Steering controls of Aeromobil.

In this system there are four distributors by which all aerodynamic forces on aeromobil are controlled (FIG. 20). Those distributors are: Distributor of group change of angle of attack of rotor blades (47), Distributor of thrust vector (49), and Distributor of break vector (50).

Distributor of group change of angle of attack (47) has function to activate cylinders CGCAA (20) on all four generators simultaneously and equally. In this way, CGCAA causes change of angle of attack of blade (19) on all four generators. This brings about equal increase of lift on all four rotors. By this distributor, pilot controls with his right hand, and there is gas handle on its lever, so that work of engine and total value of lift can be controlled simultaneously by the right hand in the same time.

Its design is identical to design of Distributor of thrust vector (49), with the only difference that it is handle, not a foot pedal. Distributor of thrust vector (FIG. 21) has function to activate cylinders CGCLD (10) simultaneously and equally on all four generators and brings about turn of eccentric bearing around thrust shaft which has equal turn of direction of lift on all generators as its consequence. This gives thrust vector to the aircraft, which coincides with its vertical axle and gives to the aircraft horizontal translational speed.

This distributor is consisted of Chamber of high pressure tl (54), Chamber of low pressure tl (53), Conductor of high pressure tl (77), Hydraulic connection for CGCLD (55), Pedal axle (56), Receptacle of low pressure tl (57), Carrier tl (58), Border tl (59), and Spring padel (60). Distributor functions in a way that oil (under pressure) gets into cylindrical Chamber of high pressure tl (54) through axle (56) which goes through center of that chamber. By pressing on lever (51) this chamber (together with Conductor of high pressure tl (77) and Breeches tl (2), turns itself around axle (56), opens hydraulic coupling for CGCLD (55). Upper coupling is connected to Conductor of high pressure tl (77) through which oil is sent to CGCLD (10). From the other side of piston of that cylinder oil comes back to Chamber of low pressure tl (53) and through Connection of low pressure tl (57) goes to oil tank. By ceasing of effect of force on pedal under effects of spring, Chamber of high pressure, tl together with Conductor tl (77) and Breeches, gets to previous position in which Hydraulic connections for CGCDL (55) are closed, which provides the piston to preserve attained position and Lift vector by itself.

Distributor for Brake vector (50) has function to annul Thrust vector and gives it opposite direction which it has in progressive translational motion ahead. Result of that is occurrence of negative thrust which put aircraft in soaring position, and according to wish, the aircraft can get into progressive motion backwards.

Distributor for control of direction, altitude and laterally (FIG. 22) has function to provide to the pilot setting of the aircraft in any position in space whether it is in order of soaring or translational motion in any direction. Distributor is consisted of: Chamber of high pressure (63), Chamber of Low pressure (70), Joint ball (71), Conductor of high pressure (64), Distributor cap for Cylinders CMz (65), Breech (68), Hydraulic connection for CMx (74), CMy (671, CMz (62), and Control lever (61). During effect on Control lever (61), which has two handles (for left and right hand), starts rotating of Chamber of high pressure (63) around Joint ball (71). During that conductor of high pressure (64) is connected to Hydraulic connection, which conditions pass of oil under pressure to hydraulic cylinder on Control head of Aerodynamic generator with simultaneous coming out of oil, on the other side of cylinder's piston into Chamber of Low pressure (70) and from this over to Connection of low pressure (75) and into oil tank. Oil comes from oil tank into Chamber of high pressure (63), over oil pump, Connection of High pressure (72), Carrier (73), Joint ball (71), respectively, and through Stopper (69) gets into Chamber of low pressure (63). In this place wall of Chamber of low pressure (70) keeps it, until lever of control and connection of conductor of High pressure (64) affects hydraulic connections.

During effect on lever of control (61) forward there is rotating of Chamber of high pressure (63) around lateral Stopper (69) and connecting of Conductor of high pressure (64) with Hydraulic connections CMy (67) which are situated on the outside of the wall of Chamber of law pressure (70). In that moment there is connecting of conductor (64) on the lower Hydraulic connections CMy (67), and from back outside of this distributor there is connection with upper Connection CMy. This brings about moving of the piston in Cylinders CMy (9) so that pistons in front two generators go down and reduce angle of attack of blades i.e. lift until pistons in two back Generators go up and increase angle of attack of rotor blades i.e. lift. This control brings about occurrence which results in turning of the aircraft around transverse axle. Bringing of lever (61) into initial position there are turning off and ceasing of turning of the aircraft around this axle for immediate putting in the same level of the pressure on the both side of Piston of CMy. This makes possible for springs, which are situated in cylinders, to get piston back to the initial position which leads to putting on the same level of lift on all four aerodynamic generators.

During effect on lever (61) in opposite direction, there is occurrence of the same but in opposite direction. This turns itself off by bringing Lever (61) into neutral position. If Lever for control (61) moves itself right, there is connecting of lateral Conductors of high pressure on lower Hydraulic connections CMx (74), which is situated on the. right side of the wall of Chamber of low pressure (70) and there is connection of upper coupling on the left side, too. By this, oil gets into CMx (7) on Control head of generators in the way that pistons in CMx (7), on the left side, go up and increase angle of attack of blades i.e. Lift vector on the left side of the aircraft but Lift vector is reduced for the same value on generators on the right side of the aircraft. This brings about occurrence of lateral moment which turns the aircraft around longitudinal axle of the aircraft. Bringing the lever back into neutral position this turns itself off.

During bringing of lever into opposite side, there is turn of the aircraft into opposite direction. If Lever of control (61) turns itself around vertical axle which goes through poles of Chamber of high pressure (63), there is connecting of Hydraulic Coupling CMz (62); which is situated on Distributor cap (65); with Conductor of high pressure. This provides pass of oil from Chamber of high pressure (63) into Cylinders CMz (12) on Control head of rotor. That causes turning of pistons of Cylinder CMz (12) around Drive shaft (13) of rotor which brings about turn of Lift vector. This also brings about occurrence of Lift vector which is according to intensity equal on right as well as on left generators, but their direction is opposite. This process turns the aircraft around vertical axle z. Direction of turn of the aircraft is equal to direction of turn of Lever of control. By bringing of this lever into neutral position there is putting of pressure on both sides of piston of cylinders CMZ (12) on the initial level. Under effect of springs (39) which are on both sides of pistons within these cylinders there is bringing of lift of direction to initial position. By this, provoked coupling is off and turning of the aircraft around vertical axle is ceased.

Figure 23:
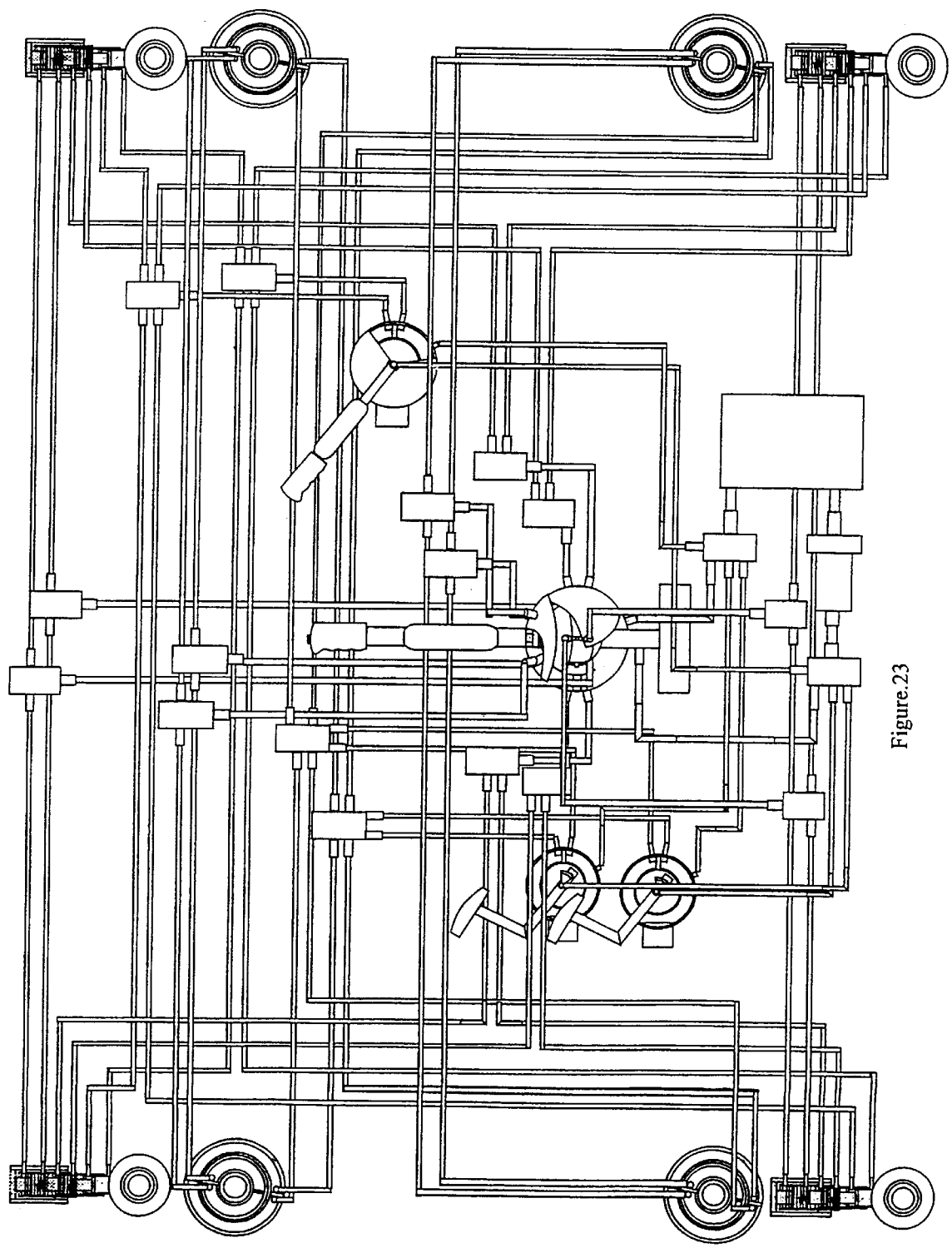

Total scheme of hydraulic control system of aeromobil is presented on (FIG. 23). All controls of aeromobil are independent from each other so they can be switched on individually or all in the same time but their effect will be totally preserved and independent. It means that Aeromobil can turn simultaneously around all three space axles and it can go up and move translationally in any direction.

Aeromobil has two orders of control: Optimal order of control and Extreme order of control.

Optimal order of control is condition of control when direction of force of lift of aerodynamic generators is tied to position of the aircraft in space (it means that if the aircraft turns itself into any direction i.e. around any of its space axles), for the same angle and into same direction is direction of lift force turned. However, in order of extreme control direction of lift force is not tied to position of the aircraft in space; therefore, in this condition, control of the aircraft can be turned and even rotated around its transverse axle y. And during this, lift direction of the aircraft will stay the same as in the moment when the aircraft gets into this order of control. It means that the aircraft (if it was in the, soaring position on constant height) in the moment before getting into Extreme order, preserves that soaring state (condition ) and the height, and if it turns itself for 180 degrees, it is turned itself totally upside down. This order makes possible for the aircraft that its vertical axle x can take any direction in space, and in the same time, the aircraft soars and changes height. Aeromobil can also have translational speed in direction of its cross (transversal) axle y. During this motion it can turn itself or even rotate for full circle around its cross axle X; and during motion of the aircraft neither height nor direction is changed.

Extreme order of control is activated by pressing electric switch (78) which is located in the top of lever of Distributor of control to direction, height and laterally (48).

By pressing this button electromagnetic coupling is activated (32) which 20 separates hydraulic cylinders CGCAA (20) from hydraulic cylinders CGCLD (10). That separates physically cylinders of angle of attack, together with Eccentric bearing (21), and Guide (5), Eccentric bearing (21), Hydraulic cylinders COCLD (20), and in this way transmits grip of this vector to center of Drive shaft (13) which direction is identical with direction of lift vector. In this way, lesser part of aerodynamic force is transmitted to Drive shaft (13) not only over Main axle of blade (18) and carrier of blades (4) but over Guide axle of blade (2), Guide (5) and Hydraulic cylinders CGCAA (20). So aerodynamic force of rotor blades (19) maintains direction of aerodynamic force. As fuselage of the aircraft is separated from cylinders CGCAA (20), Eccentric bearing (21), and Guide (5); it provides to Eccentric bearing (21) to maintain direction of its eccentricity regarding Drive shaft (13) although fuselage itself turns around that axle.

In Extreme order of control of aeromobil, only cylinders of change of angle of attack (Cylinder CGCAA (20), Cylinder CMx (7), and Cylinder CMy (9)) are active, until cylinders of change of direction of lift (Cylinder CMz (12), and Cylinder (10)) are excluded (switched off), for their work in that order have no sense. By repeated press on switch (78) of Extreme order, effect of electromagnet on electromagnetic coupling (32) stoops, and under influence of springs there is connecting of Cylinders of change of angle of attack with cylinders of lift-direction-change so that aircraft gets into optimal order of control.

Figure 1:
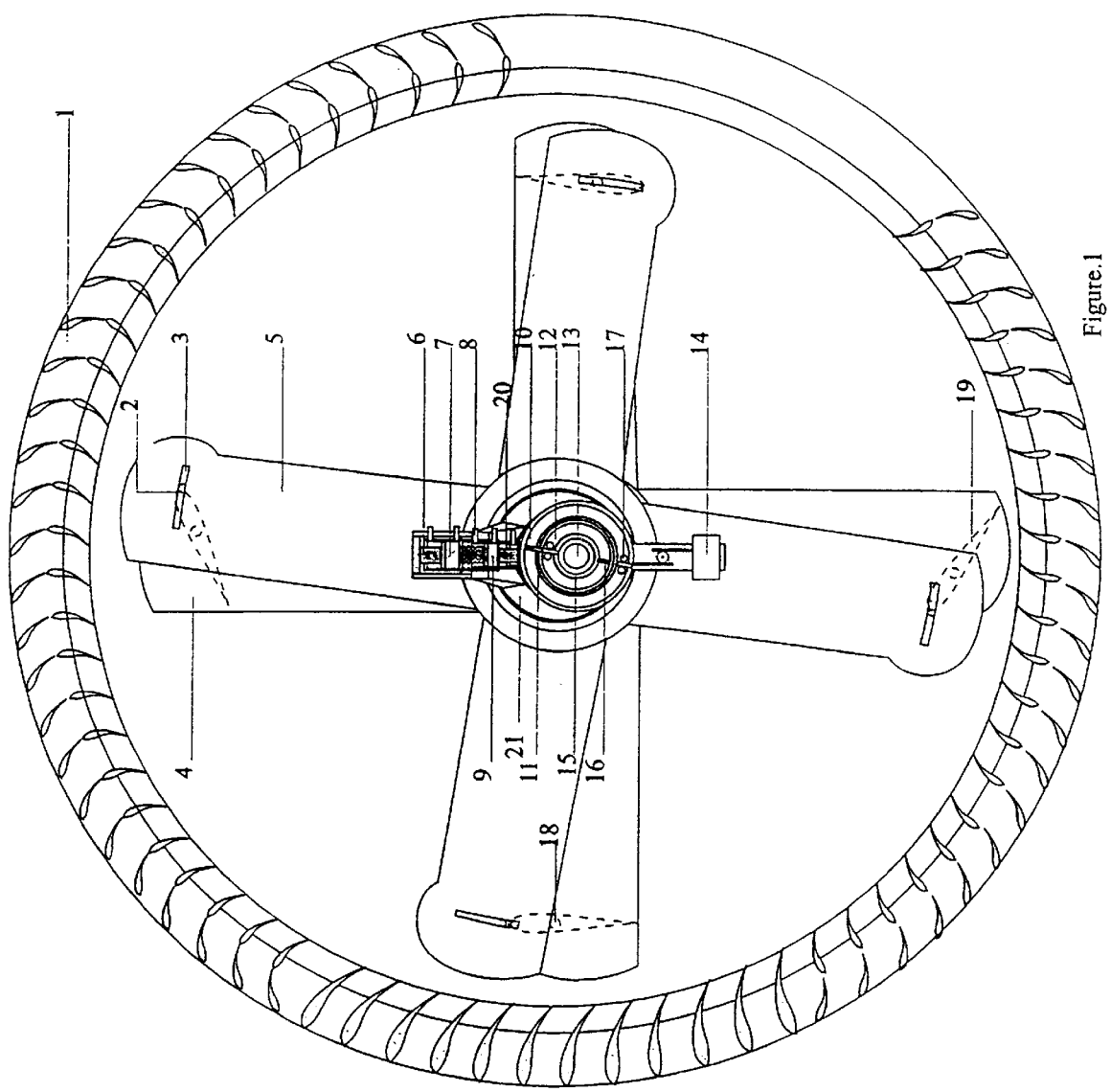
FIG. 1. Laternal view to section of aerodynamical generator with section of hydraulic cylinders for control of work of generator.

In FIG. 1 is shown a Lateral view to section of aerodynamical generator with section of hydraulic cylinders for control of work of generator 5 including a (1. Stator blades, 2. Guiding shaft, 3. Crevice for guiding , 4. Girder of blades, 5. Guide, 6. Piston of cylinder CMx, 7. Cylinder Cmx, 8. Hydraulic links, 9. Cylinder Cmy, 10. Cylinder CGCLD, 11. Cylinder piston CGCLD, 12. Cylinder CMz, 13. Drive shaft, 14. Counterweight, 15. Ball bearing, 16. Piston of cylinder CMz, 18. Main shaft, 19. Rotor blade, 20. Cylinder CGCAA, 21. Eccentric bearing)

Figure 3:
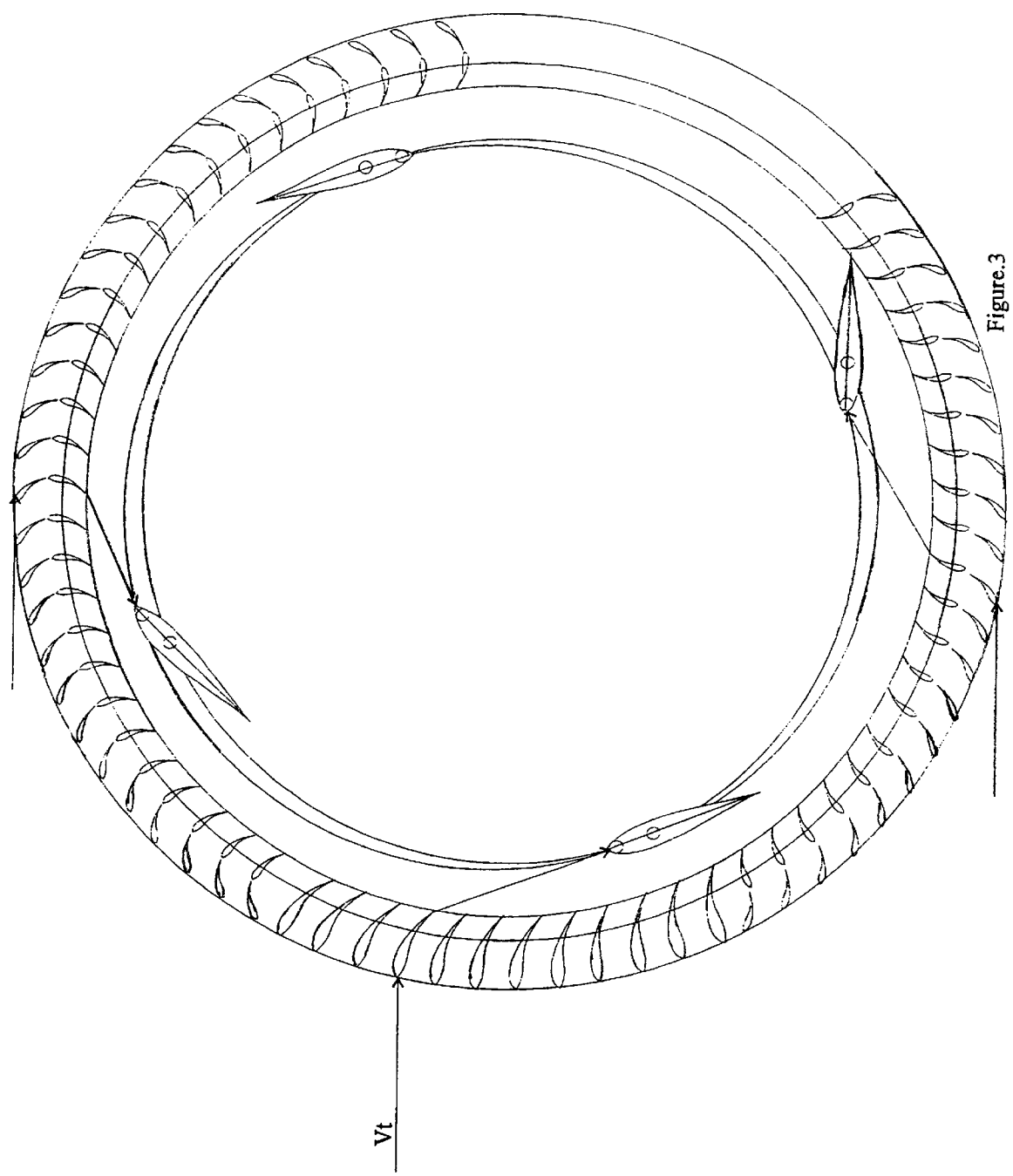
FIG. 3. Presentation of transformation of translational speed at the entrance of stator into tangential speed at the exit from stator in regard to way of rotor blade.

In FIG. 3 is shown a Presentation of transformation of translational speed at the entrance of stator into tangential speed at the exit from stator in regard to way of rotor blade. (Translational speed of aircraft).

In FIG. 4 is shown a Rotor of aerodynamic generator together with hydraulic Control head and drive shaft.

Figure 5:
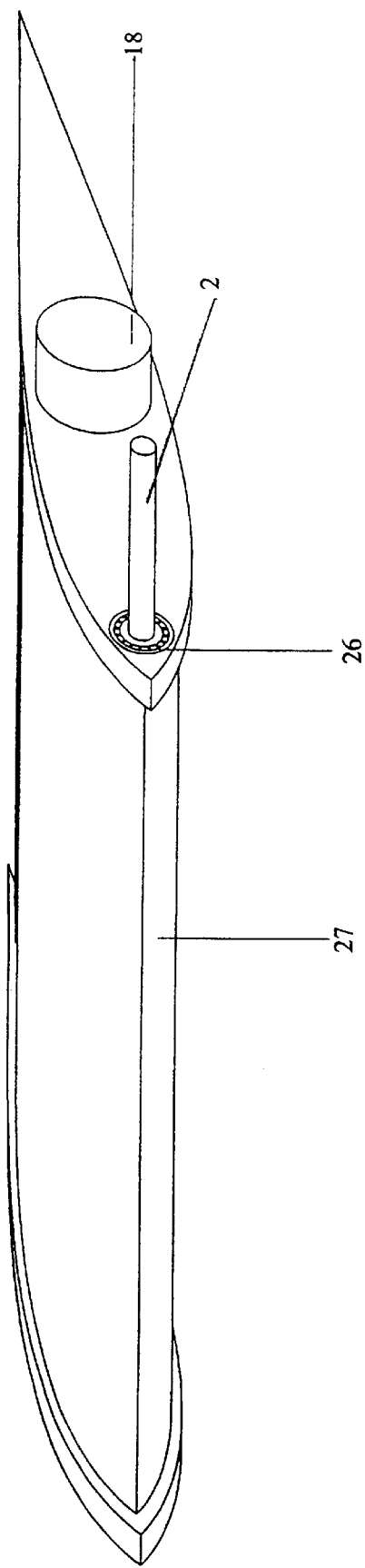
FIG. 5. Blade of rotor.

In FIG. 5 is shown a Blade of rotor including a (26. Guiding shaft bearer, 27. Blade body).

Figure 6:
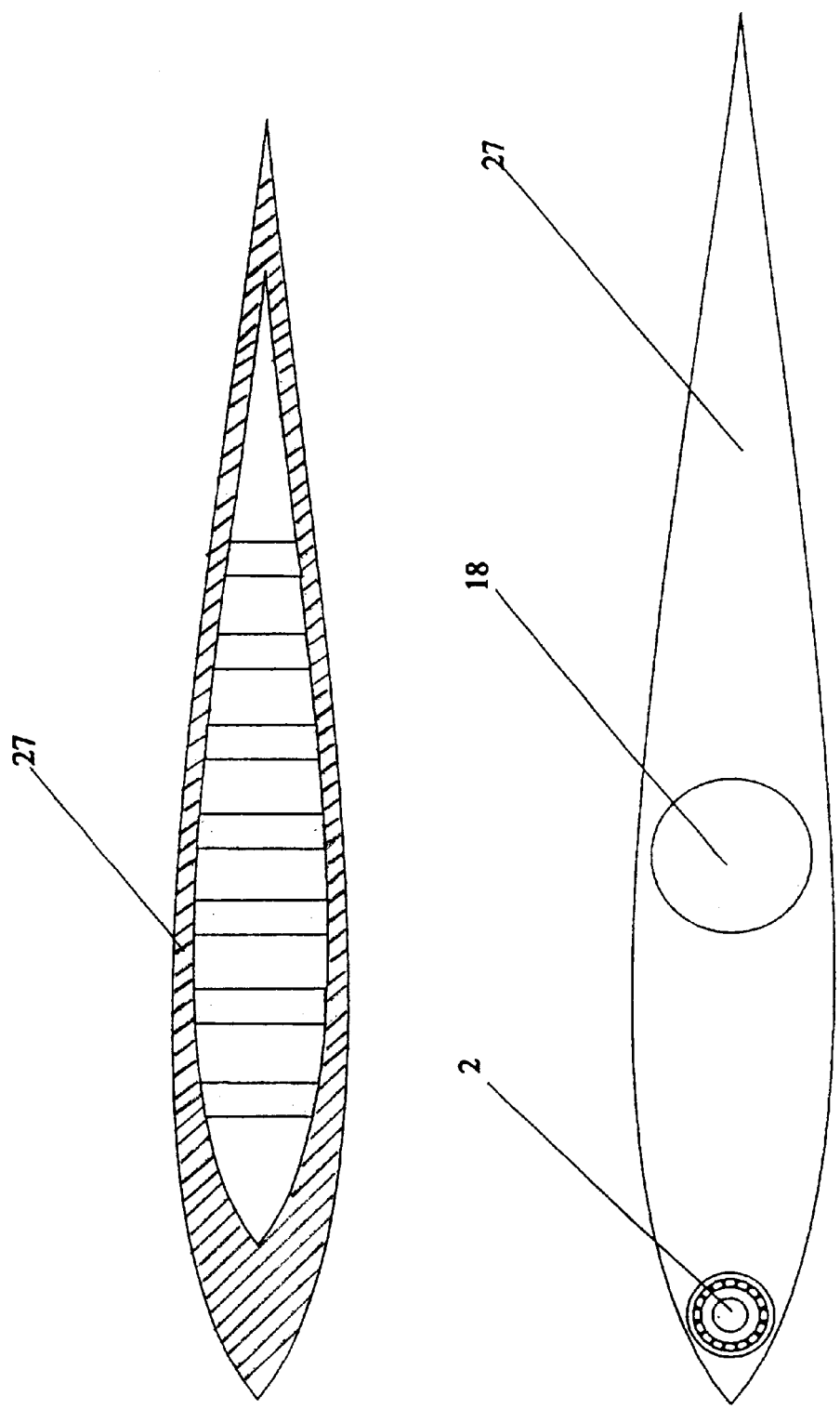
FIG. 6. Cross-section of rotor blade.

In FIG. 6 is shown a Cross-section of rotor blade.

In FIG. 7 is shown a periodic change of angle of attack of rotor blades in period of one rotation including a (Lift vector (L), Aerodynamical resistance force (Rx), Drive shaft center (0p), Center of Eccentric bearer (0e), Main shaft center (Og, Guiding shaft center (Ov).

In FIG. 8 is shown a periodic change of angel of attack of rotor blades in the state of produce of Lift and Propulsion's vector (P).

In FIG. 9 is shown a constant value of horizontal component of Lift Vector. (N) Horizontal component of Lift Vector. (Lr) Radial component of Lift Vector.

Figure 10:
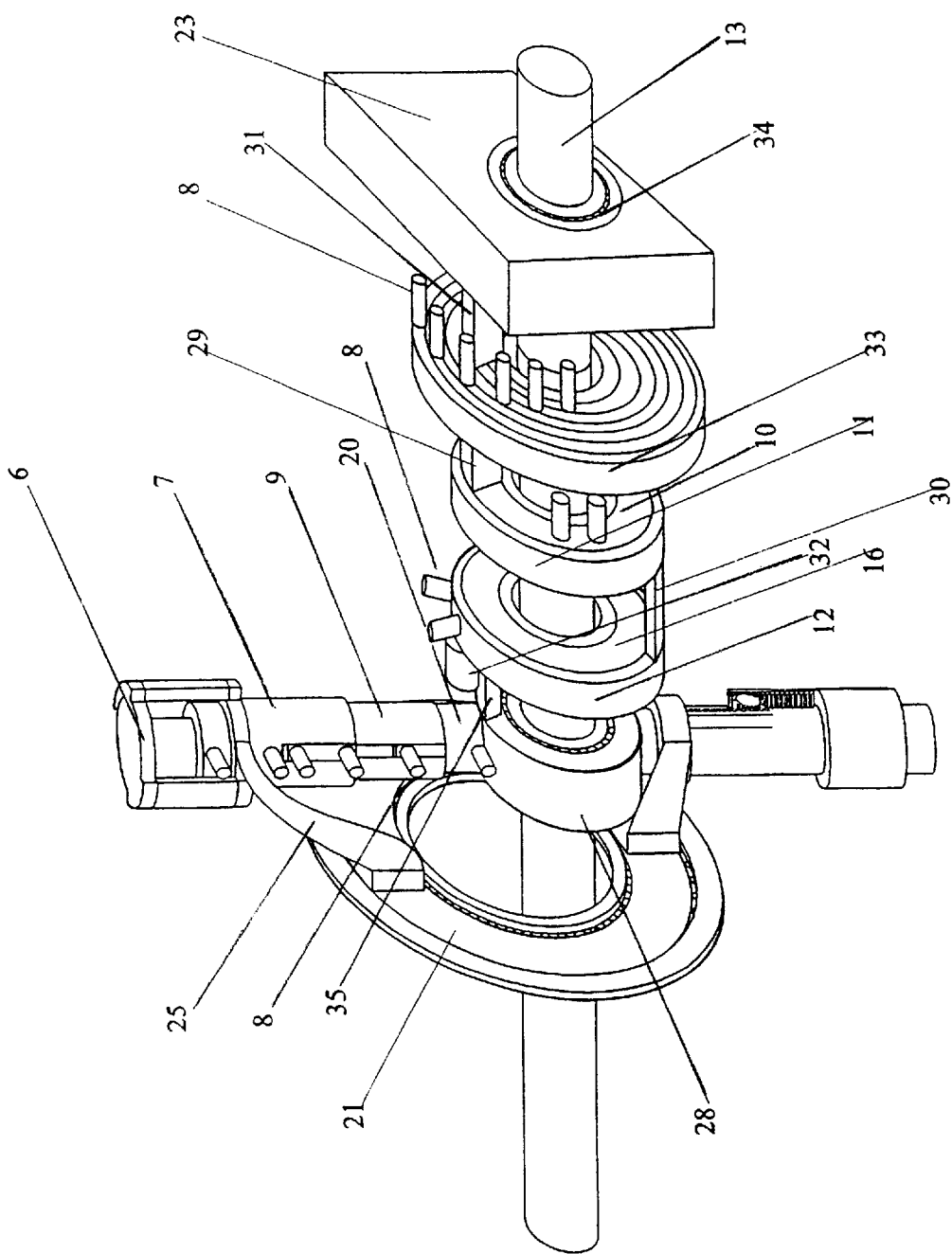
FIG. 10. Control head of Lift Vector.

In FIG. 10 is shown a Control head of Lift Vector including a (28. Cylinders' carrier, 29. Cylinder carrier CGCLD, 30. Cylinder's carrier Cmz, 31. Carrier of rotating hydraulic link, 32. Electromagnetic link, 33. Rotating hydraulic link, 34. Drive shaft bearing, 35. Cylinder piston CMz)

Figure 11:
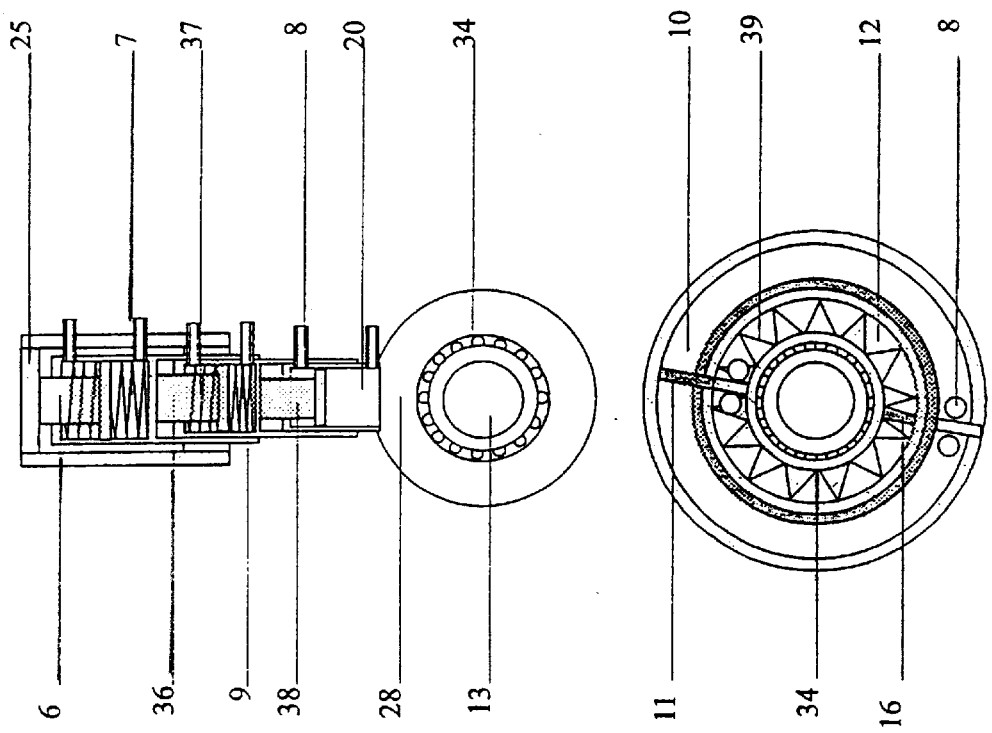
FIG. 11. Lateral section of hydraulic cylinders on control head of aerodynamical generator.

In FIG. 11 is shown a Lateral section of hydraulic cylinders on control head of aerodynamical generator including a (36). Piston of cylinder CMy, 37. Spring, 38. Piston of cylinder PNU, 39. Spring for piston CMz)

In FIG. 12 is shown a Aeromobil, family version

Figure 13:
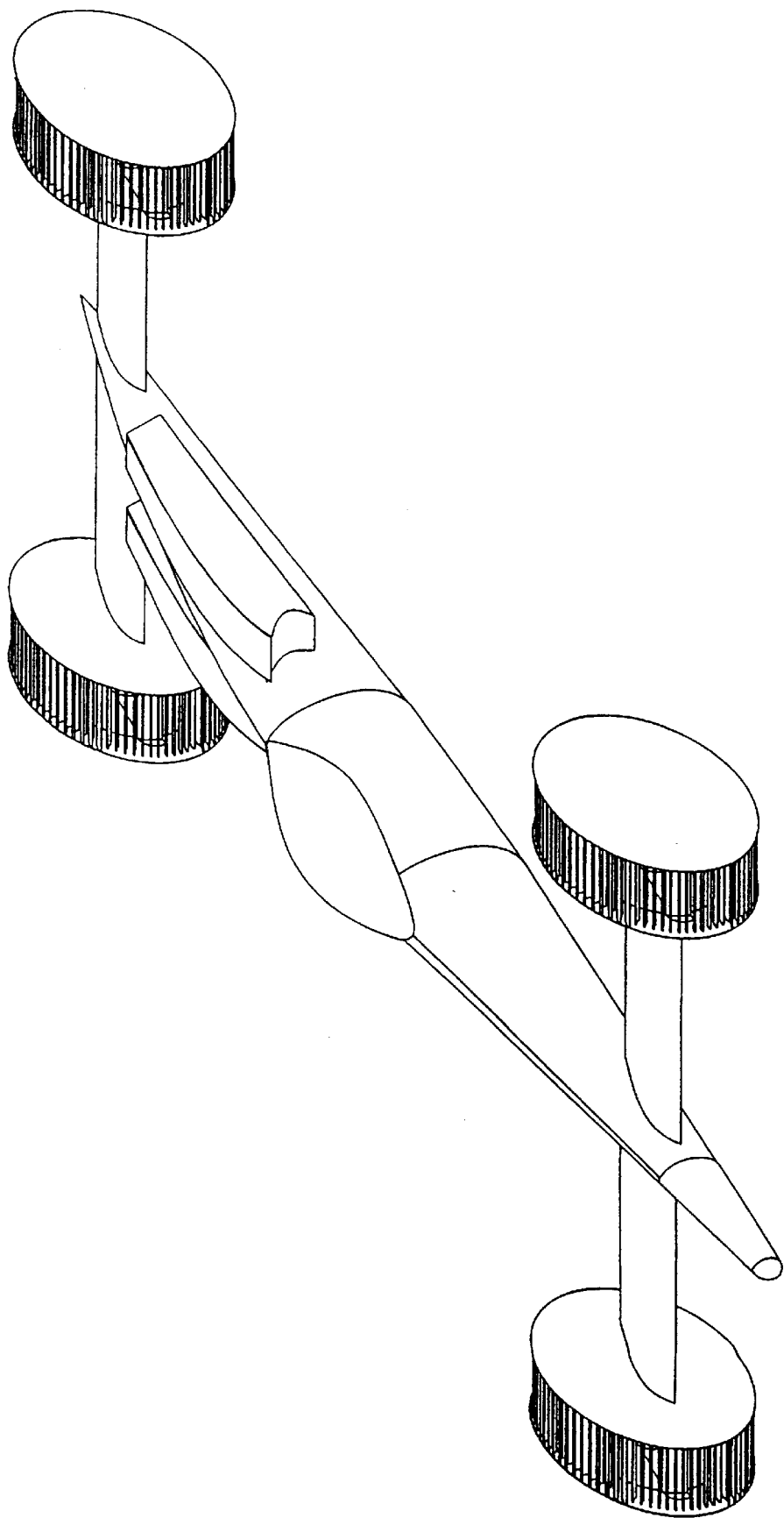
FIG. 13. Aeromobil, sports version.

In FIG. 13 is shown a Aeromobil, sports version.

Figure 14:
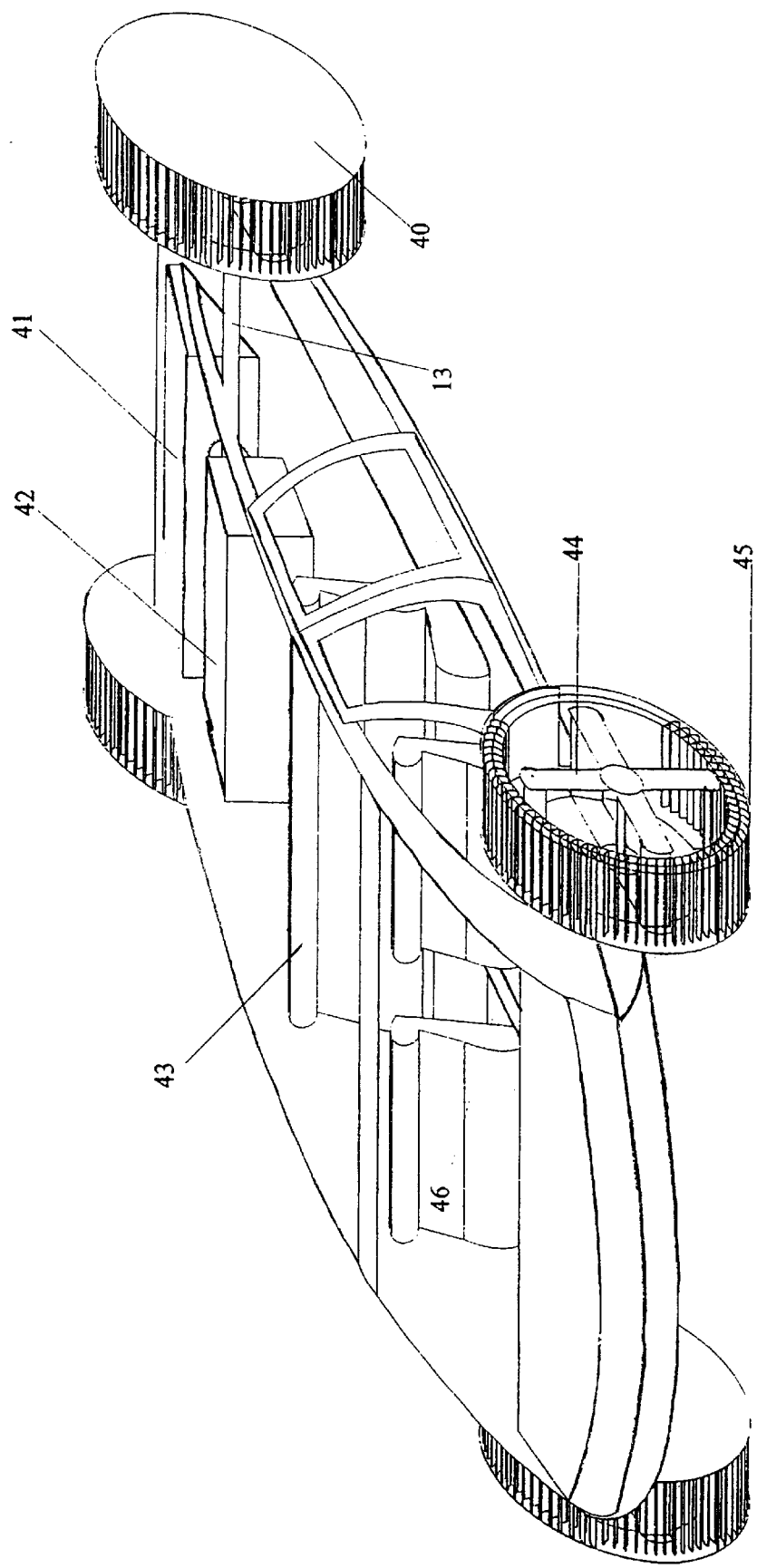
FIG. 14. Basic parts of Aeromobil.

In FIG. 14 are shown the Basic parts of Aeromobil including (Aerodynamic generator, 41. Fuel tank, 42. Engine group, 43. Seats, 44. Rotor of aerodynamical generator, 45. Stator of aerodynamical generator, 46. Main drive shaft)

Figure 15:
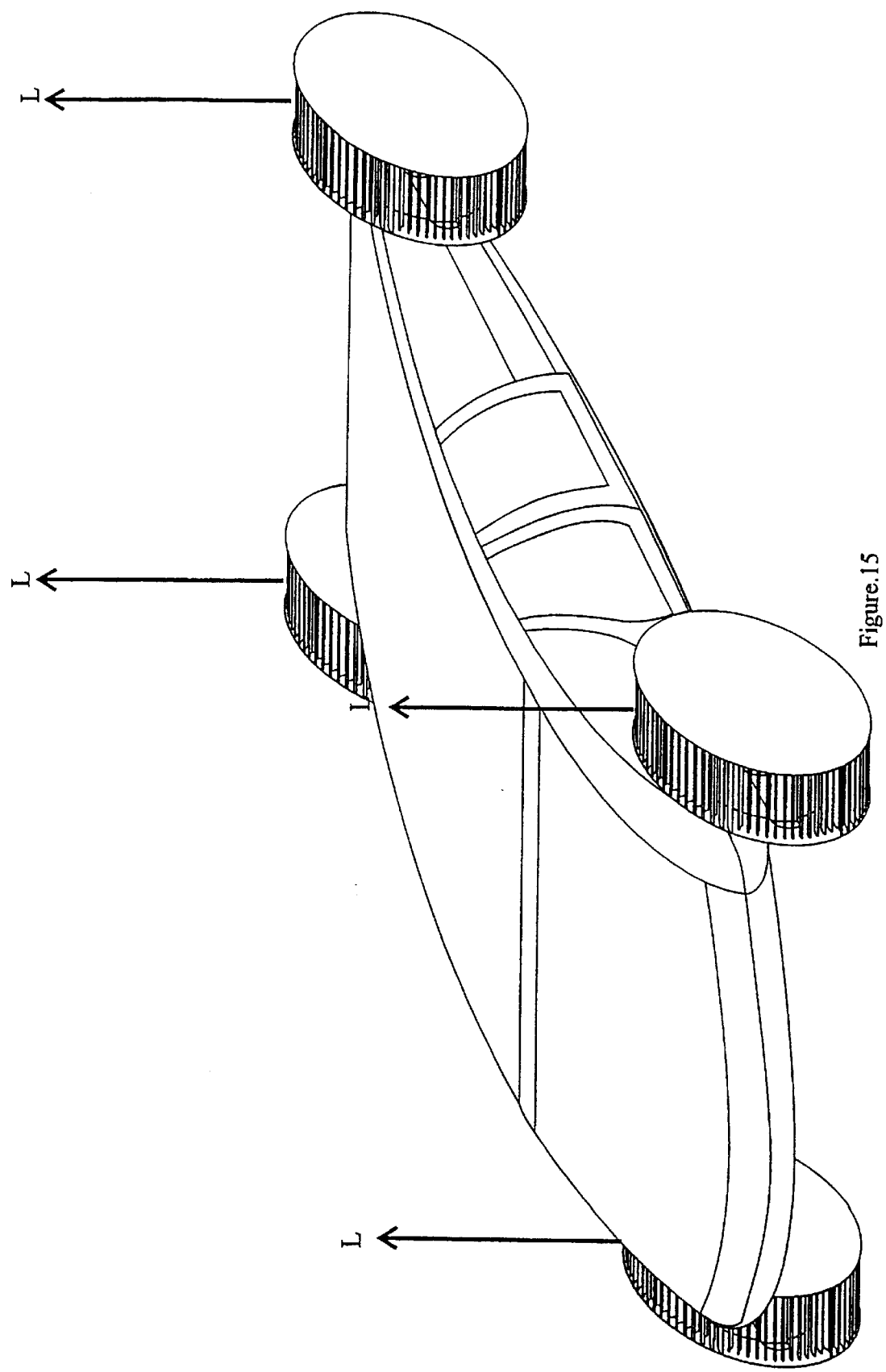
FIG. 15. Disposition of Lift vector in order of soaring or vertical translational motion.

In FIG. 15 is shown a Disposition of Lift vector in order of soaring or vertical translational motion.

Figure 16:
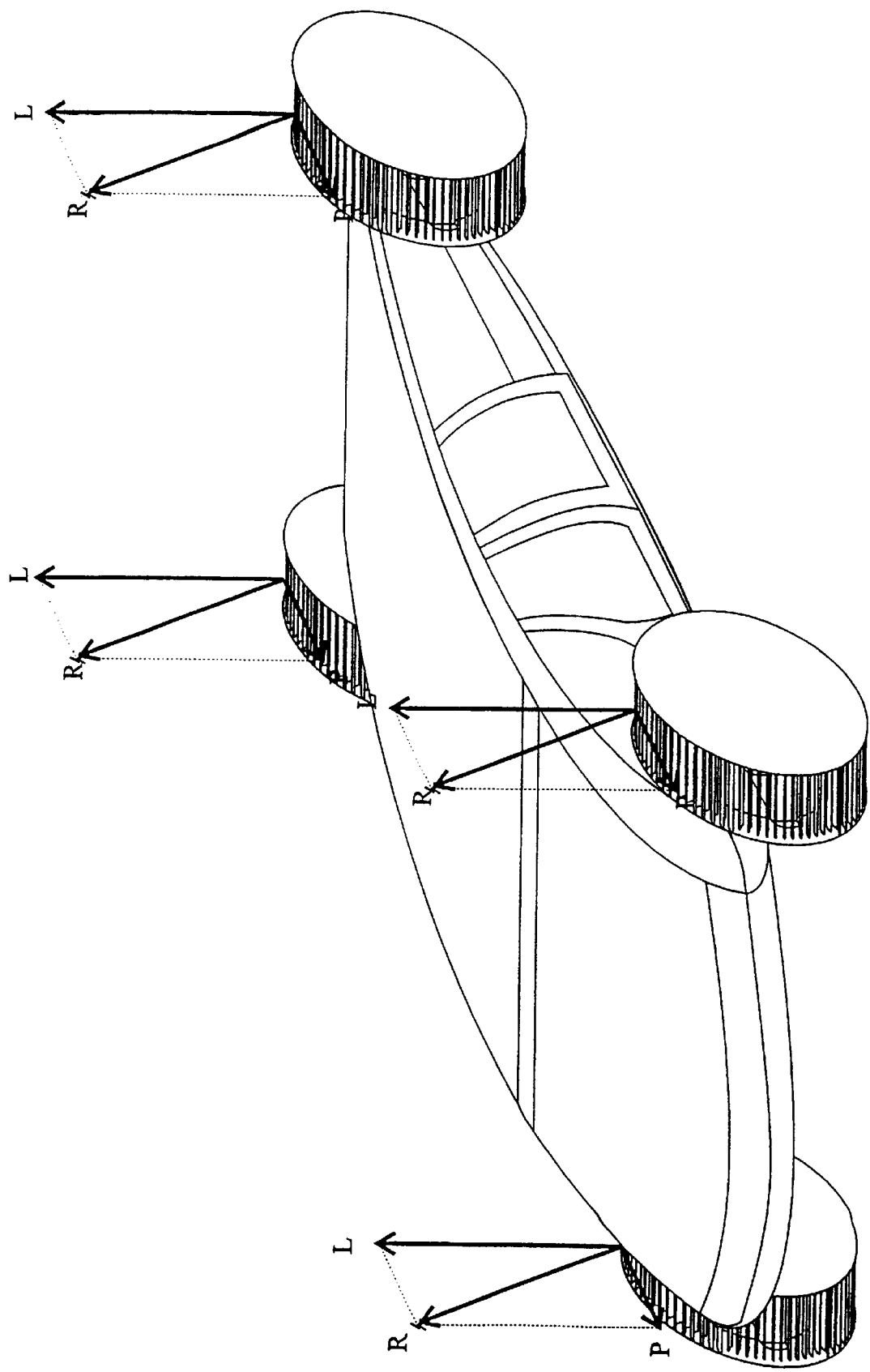
FIG. 16. Disposition of Lift vector and Thrust vector within horizontal translational motion.

In FIG. 16 is shown a Disposition of Lift vector and Thrust vector within horizontal translational motion.

Figure 17:
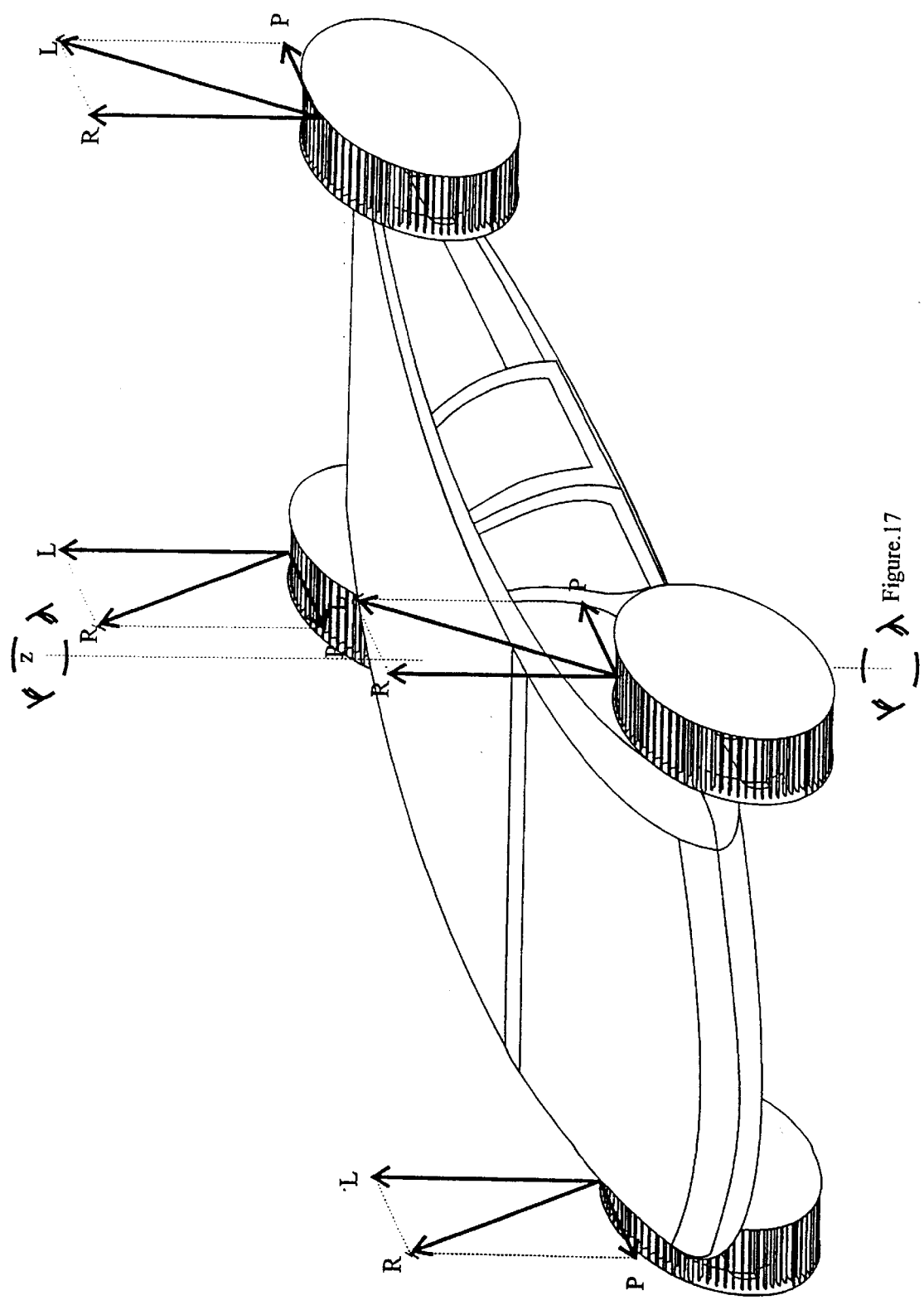
FIG. 17. Disposition of Thrust vector and Lift vector during production of turn around axis z.

In FIG. 17 is shown a Disposition of Thrust vector and Lift vector during production of turn around axis z.

Figure 18:
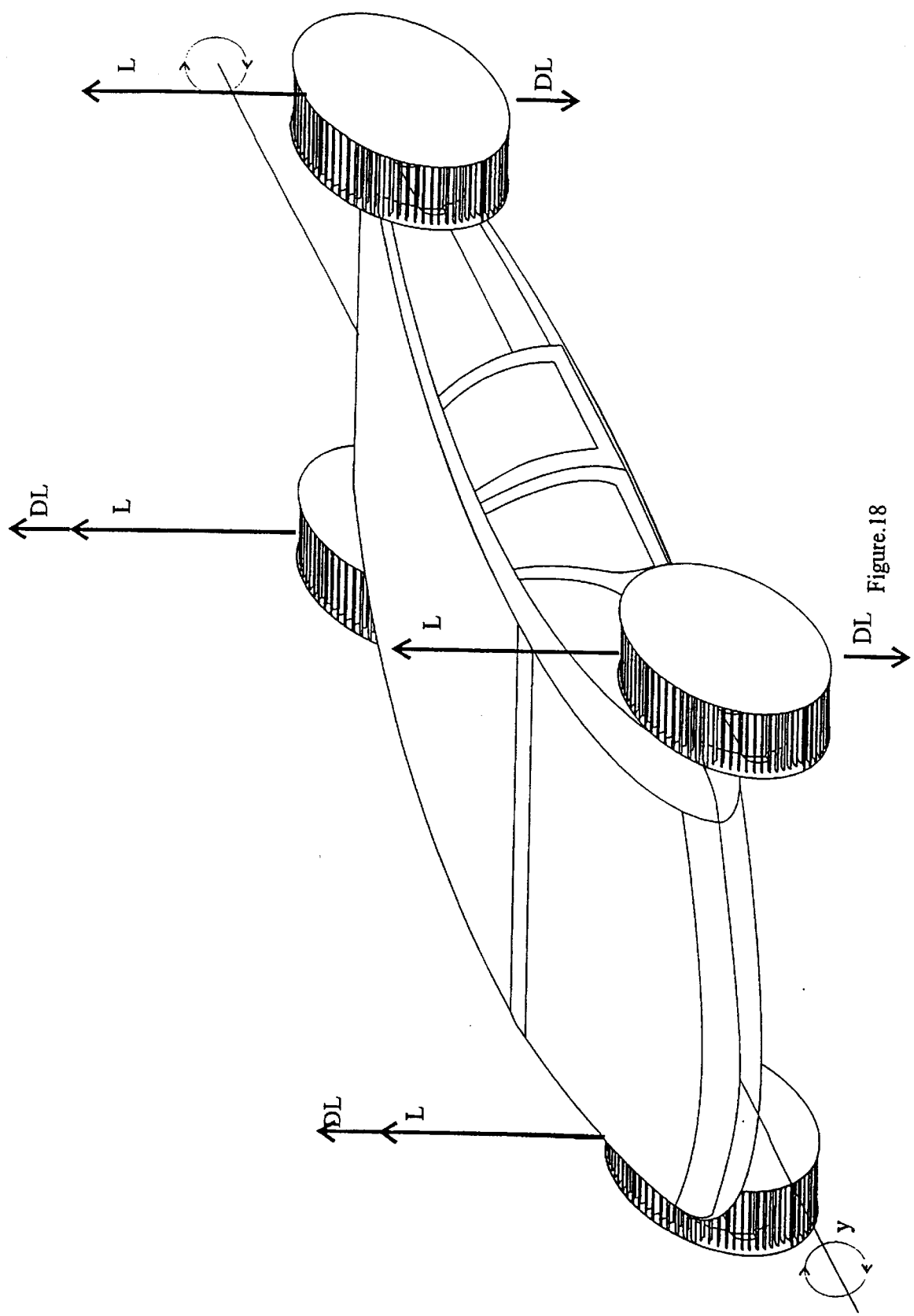
FIG. 18. Disposition of Lift vector during production of turning moment around axis y.

In FIG. 18 is shown a Disposition of Lift vector during production of turning moment around axis y.

Figure 19:
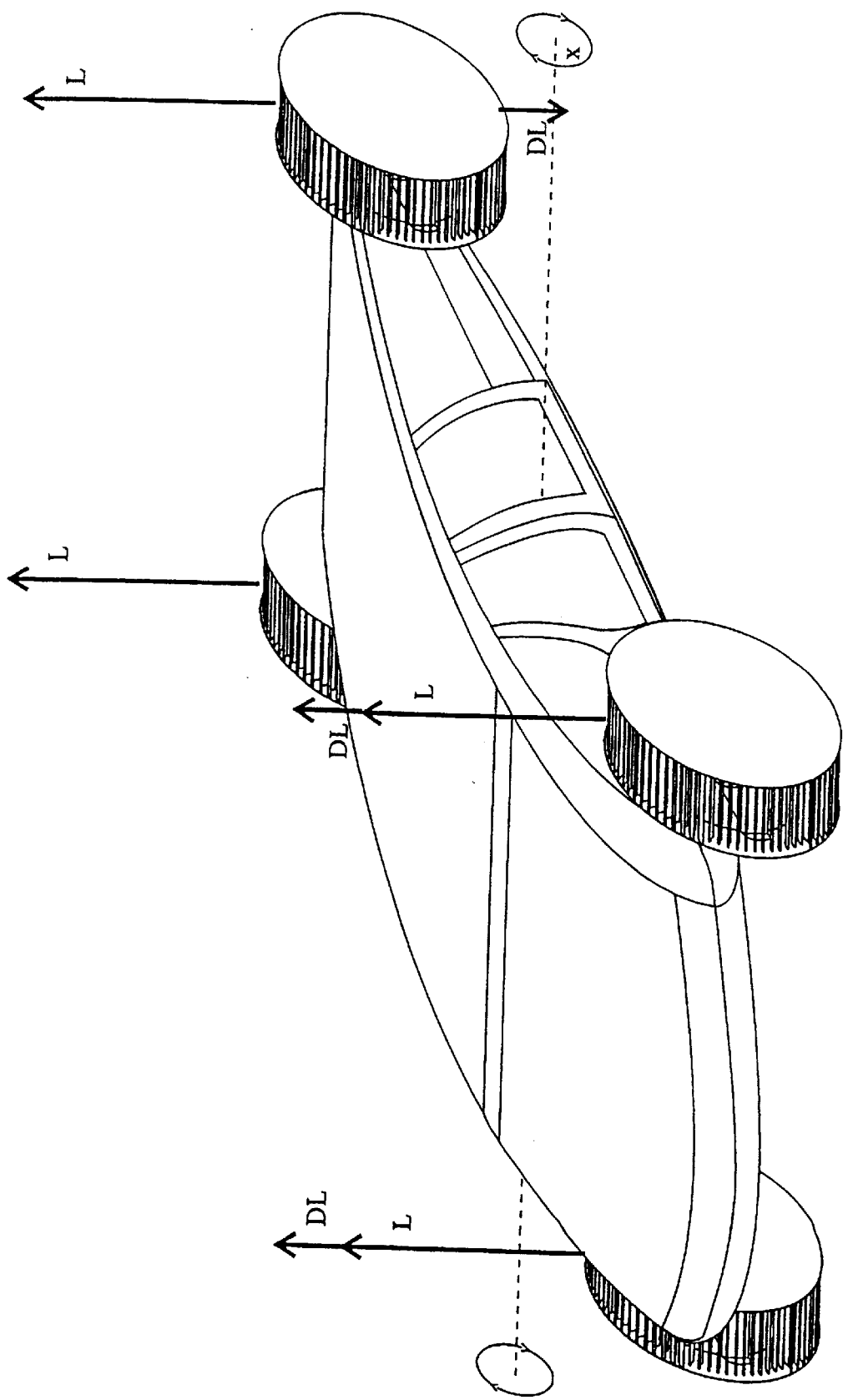
FIG. 19. Disposition of Lift Vector during production of turning moment around axis x.

In FIG. 19 is shown a Disposition of Lift Vector during production of turning moment around axis x.

In FIG. 20 is shown the Steering controls of Aeromobil including (47. Distributor for group change of angle of attack, 48. Distributor for control of direction, altitude and laterally, 49. Thrust Vector pedal, 50. Brake Vector pedal.

Figure 21:
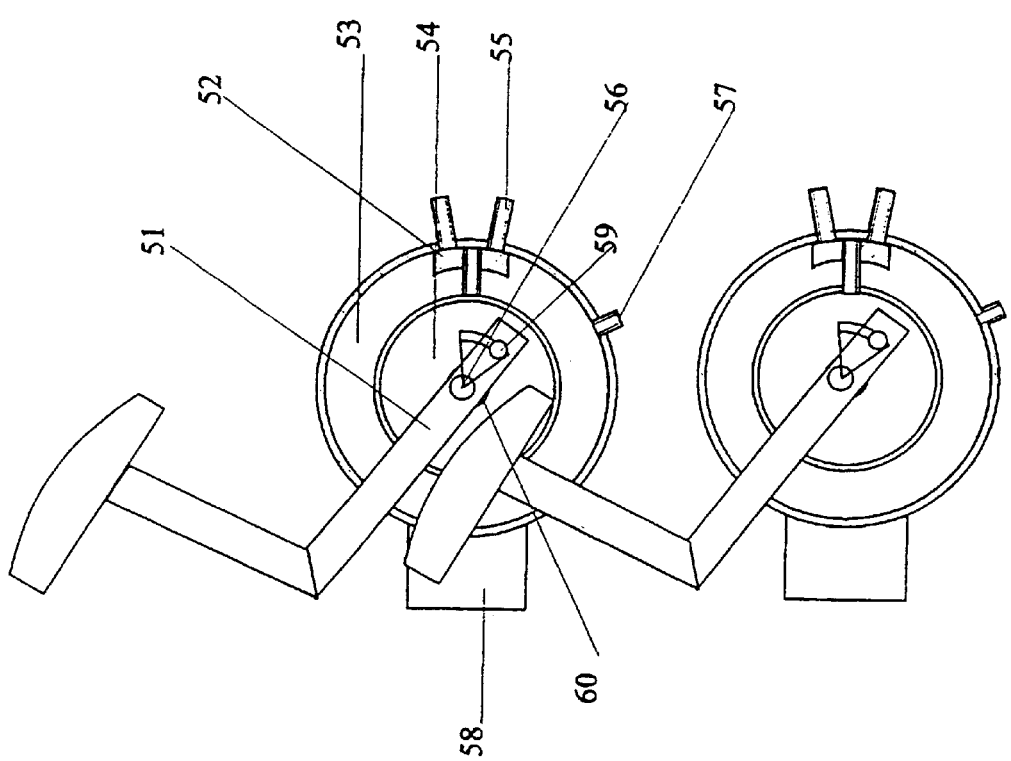
FIG. 21. Lateral section of Thrust Vector control.

In FIG. 21 is shown the Lateral section of Thrust Vector control including (51. Pedal, 53. Low pressure chamber tl. 54. High pressure chamber tl., 55. Hydraulic connection for CGCLD, 56. Pedal axle, 57. Low pressure connection tl., 58. Carrier tl. 59. Stopper tl, 60. High pressure chamber body).

Figure 22:
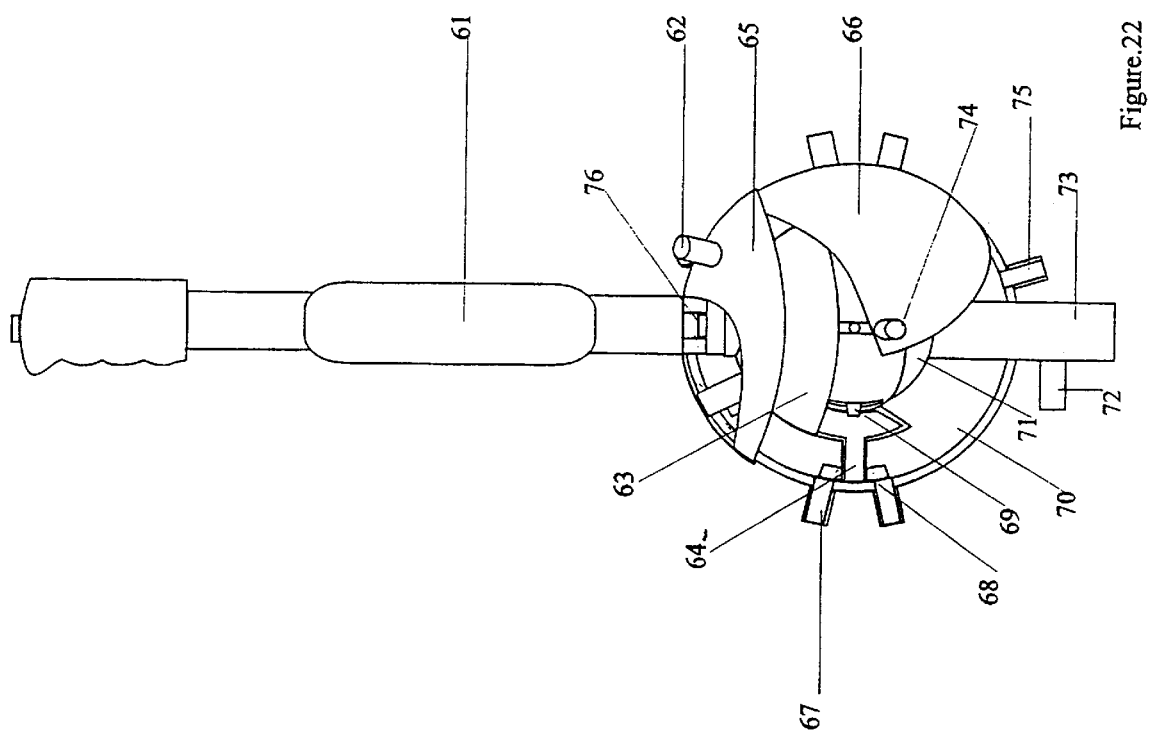
FIGS. 22 and 23. Section of Distributor and hydraulics of control direction, altitude and bylateral.

In FIGS. 22 and 23 is shown the Section of Distributor of control direction, altitude and by lateral including (61. Lever, 62. Hydraulic connection for CMz, 63. High pressure chamber, 64. High pressure conductor, 65. Distributor cap for cylinders CMz, 66. Low pressure chamber body dl, 67. Hydraulic connection for CMy, 68. Breech, 69. Stopper, 70. Low pressure chamber, 71. Joint bowl, 72. High pressure connection, 73. Carrier, 74. Hydraulic connection for CMz 75. Low pressure connection, 76. Shaft of distributor cap CMz).

What is claimed is:

1. An aircraft comprised of:

a fuselage;

a drive shaft rotatably disposed in said fuselage, said drive shaft having an end;

an aerodynamic generator disposed around said end of said shaft consisting of an aerodynamic rotor attached to said end of said shaft; and an aerodynamic stator fixed to said fuselage over said rotor;

a control device fixedly attached to said fuselage;

said control device having an actuator;

said control device controlling said aerodynamic generator with said actuator;

said control device being responsive to a plurality of commands;

wherein said aerodynamic generator produces an aerodynamic force in response to one of said commands whose intensity, direction and sense of direction can be controlled through said control device;

wherein vertical lifting and landing are achieved by orienting the direction and sense of direction of the aerodynamic force vertically in respect to the horizon plane;

wherein said aerodynamic rotor further comprises a blade carrier fixedly attached to said shaft end;

four aeroprofiles disposed symmetrically about said shaft on said blade carrier, said aeroprofiles having a Main Axis and a Guided Axis;

said control device including an eccentric bearing having an eccentric axis;

a guide linkably connecting said eccentric bearing and said guided axis of said aeroprofile;

wherein the aeroprofiles are rotatably connected to said blade carrier about the Main Axis of the aeroprofile;

said aeroprofiles rotating around the Drive Shaft and oscillating in circles around the main axis of the aeroprofile wherein the Eccentric Bearing can be translated with respect to the Drive Shaft and can rotate around a center of Drive Shaft from 0 to 360°;

wherein translating the center of the Eccentric Bearing with respect to the Drive Shaft provokes an eccentricity of the Eccentric Bearing which is then transmitted by the Guide-bar to the Guided Axis on the rotor aeroprofiles, causing rotation of the aeroprofile around the Main Axis for the angle of attack proportional to the eccentricity of the Guide-bar and which in one full revolution changes as function of a sinus of an angle of the aeroprofile with respect to a center of Drive Shaft.

2. An aircraft comprising:

a fuselage;

a drive shaft rotatably disposed in said fuselage, said drive shaft having an end;

an aerodynamic rotor attached to said end of said shaft;

wherein said aerodynamic rotor comprises a blade carrier fixedly attached to said shaft end and four aeroprofiles disposed symmetrically about said drive shaft on said blade carrier, said aeroprofiles having a main axle and guided axle and being connected to said blade carrier for rotation around the main axle;

a control device being responsive to a plurality of commands, said control device being fixedly attached to said fuselage and including an eccentric bearing and said guided axle of said aeroprofile;

wherein said aeroprofiles rotate around said drive shaft and oscillate in circles around said main axle of the aeroprofile, and said eccentric bearing can be translated with respect to said drive shaft and can rotate around a center of said drive shaft from 0 to 360 degrees;

wherein translating the center of the eccentric bearing with respect to the drive shaft involves an eccentricity of said eccentric bearing which is then transmitted by a guide-bar to said guided axle of said aeroprofiles, thereby causing rotation of said aeroprofile around said main axle for changing an angle of attack proportional to said eccentricity, said angle of attack changing during one full revolution as a function of a sinus of an angle of said aeroprofile with respect to a center of said drive shaft, whereby said aerodynamic rotor produces an aerodynamic force in response to one of said commands whose intensity, direction and sense of direction can be controlled through said control device;

wherein vertical lifting and landing of said aircraft are achieved by manipulating the translation of the center of the eccentric bearing with respect to said drive shaft and orienting the eccentricity of the eccentric bearing, on all four rotors, vertically in respect to the horizontal plane;

wherein horizontal flight of said aircraft is achieved by orienting the eccentricity of said eccentric bearing, on all four rotors, under certain angle in respect to the horizon, and depending on whether the angle of rotation is in respect to the front or back part of the aircraft horizontal flight forward or backward, respectively, is obtained;

wherein rotation of said aircraft around pitch axis is obtained by opposite changing the eccentricity of said eccentric bearing on two front-side rotors with respect to two back-side rotors in a way that if the eccentricity on front-side rotors is increased, the eccentricity on back-side rotors is decreased for the same value;

wherein rotation of said aircraft around roll axis is obtained by opposite changing the eccentricity of the eccentric bearing on two left-side rotors in respect to two right-side rotors in a way that if the eccentricity of the eccentric bearing on left-side rotors is increased, the eccentricity of the eccentric bearing on right-side rotors is decreased for the same value;

wherein rotation of said aircraft around vertical axis is obtained by opposite rotating the eccentricity of the eccentric bearing on two left-side rotors in respect to two right-side rotors in a way that if the rotation of the eccentricity of the eccentric bearing on left-side rotors changes for a certain angle towards front part of the aircraft and on the left-side rotors towards back part of the aircraft or the opposite, the rotation leftward or rightward, respectively, will be obtained;

wherein all commands of the said aircraft are independent one from another and can be applied one by one individually or all of them simultaneously, without changing the sense of any of them; no matter in which position and speed the aircraft is.

* * * * *